(12) United States Patent
Grauman et al.

(10) Patent No.: US 11,810,354 B2
(45) Date of Patent: Nov. 7, 2023

(54) GENERATING DIGITAL FLOORPLANS FROM SPARSE DIGITAL VIDEO UTILIZING AN AUDIO-VISUAL FLOORPLAN RECONSTRUCTION MACHINE LEARNING MODEL

(71) Applicant: Meta Platforms, Inc., Menlo Park, CA (US)

(72) Inventors: Kristen Lorraine Grauman, Austin, TX (US); Senthil Purushwalkam Shiva Prakash, Pittsburgh, PA (US); Sebastia Vicenc Amengual Gari, Redmond, WA (US); Vamsi Krishna Ithapu, Kirkland, WA (US); Carl Schissler, Redmond, WA (US); Philip Robinson, Seattle, WA (US); Abhinav Gupta, Pittsburgh, PA (US)

(73) Assignee: Meta Platforms, Inc., Menlo Park, CA (US)

( * ) Notice: Subject to any disclaimer, the term of this patent is extended or adjusted under 35 U.S.C. 154(b) by 247 days.

(21) Appl. No.: 17/228,112

(22) Filed: Apr. 12, 2021

(65) Prior Publication Data
US 2022/0327316 A1 Oct. 13, 2022

(51) Int. Cl.
*G06V 20/40* (2022.01)
*G06T 11/20* (2006.01)
(Continued)

(52) U.S. Cl.
CPC ............. *G06V 20/46* (2022.01); *G06F 18/25* (2023.01); *G06N 3/08* (2013.01); *G06T 11/203* (2013.01); *G06V 20/41* (2022.01); *G10L 25/57* (2013.01)

(58) Field of Classification Search
CPC ......... G06F 18/25; G06N 3/08; G06T 11/203; G06T 7/73; G10L 25/30; G10L 25/57; G06V 20/41; G06V 20/46
See application file for complete search history.

(56) References Cited

U.S. PATENT DOCUMENTS 8,924,202 B2 * 12/2014 Vasilache ............ H03M 7/3082
704/230
11,039,043 B1 * 6/2021 Zhang .................... G06N 3/045
(Continued)

OTHER PUBLICATIONS

BatVision: Learning to See 3D Spatial Layout with Two Ears, Mar. 19, 2020, Jesper Haahr Christensen (Year: 2020).*
(Continued)

*Primary Examiner* — Ming Wu
(74) *Attorney, Agent, or Firm* — Keller Preece PLLC

(57) ABSTRACT

The present disclosure relates to systems, non-transitory computer-readable media, and methods for utilizing multiple modalities to generate accurate two-dimensional floorplans based on sparse digital videos depicting three-dimensional space. In particular, in one or more embodiments, the disclosed systems extract both visual and audio information from sparse digital video coverage of portions of a three-dimensional space and utilize the extracted visual and audio information to generate a two-dimensional floorplan representing both viewed and unviewed portions of the three-dimensional space. For example, the disclosed systems utilize self-attention layers of a specialized machine learning model to maintain and leverage bi-directional relationships among sequences of visual and audio features to generate floorplan predictions associated with the three-dimensional space. The disclosed systems then combine the predictions to generate the two-dimensional floorplan including a geometric layout and one or more semantic room labels.

20 Claims, 13 Drawing Sheets

(51) Int. Cl.
G06N 3/08 (2023.01)
G10L 25/57 (2013.01)
G06F 18/25 (2023.01)

(56) References Cited

U.S. PATENT DOCUMENTS

2019/0306540 A1* 10/2019 Holmberg ............ H04N 21/632
2021/0073449 A1* 3/2021 Segev ................... G06F 30/27
2021/0287430 A1* 9/2021 Li ............................ G06T 7/40

OTHER PUBLICATIONS

B. Rafaely, "Analysis and design of spherical microphone arrays," in IEEE Transactions on Speech and Audio Processing, vol. 13, No. 1, pp. 135-143, Jan. 2005, doi: 10.1109/TSA.2004.839244.
T. Abhayapala and D. Ward. Theory and design of higher order sound field microphones using spherical microphone array. In ICASSP, 2002.
Marcus A. Brubaker, Andreas Geiger, and Raquel Urtasun. Lost! leveraging the crowd for probabilistic visual self-localization. In CVPR, 2013.
Angel Chang, Angela Dai, Thomas Funkhouser, Maciej Halber, Matthias Niessner, Manolis Savva, Shuran Song, Andy Zeng, and Yinda Zhang. Matterport3d: Learning from rgb-d data in indoor environments. arXiv preprint arXiv:1709.06158. Matterport3D license available at http://kaldir.vc.in.tum.de/matterport/MP_TOS.pdf., 2017.
Devendra Singh Chaplot, Dhiraj Gandhi, Saurabh Gupta, Abhinav Gupta, and Ruslan Salakhutdinov. Learning to explore using active neural slam. arXiv preprint arXiv:2004.05155, 2020.
Changan Chen, Unnat Jain, Carl Schissler, Sebastia Vicenc Amengual Gari, Ziad Al-Halah, Vamsi Krishna Ithapu, Philip Robinson, and Kristen Grauman. Audio-visual em-bodied navigation. arXiv preprint arXiv:1912.11474, 2019.
Changan Chen, Unnat Jain, Carl Schissler, Sebastia Vicenc Amengual Gari, Ziad Al-Halah, Vamsi Krishna Ithapu, Philip Robinson, and Kristen Grauman. Soundspaces: Audio-visual navigation in 3d environments. In ECCV, 2020.
Changan Chen, Sagnik Majumder, Ziad Al-Halah, Ruohan Gao, Santhosh Kumar Ramakrishnan, and Kristen Grauman. Learning to set waypoints for audio-visual navigation. In arXiv, 2020.
Jiacheng Chen, Chen Liu, Jiaye Wu, and Yasutaka Furukawa. Floor-sp: Inverse cad for floorplans by sequential room-wise shortest path. In Proceedings of the IEEE International Conference on Computer Vision, pp. 2661-2670, 2019.
Tao Chen, Saurabh Gupta, and Abhinav Gupta. Learning exploration policies for navigation. In 7th International Conference on Learning Representations, ICLR 2019, 2019.
Jesper Haahr Christensen, Sascha Hornauer, and X Yu Stella. Batvision: Learning to see 3d spatial layout with two ears. In 2020 IEEE International Conference on Robotics and Automation (ICRA), pp. 1581-1587. IEEE, 2020.
Marco Crocco, Samuele Martelli, Andrea Trucco, Andrea Zunino, and Vittorio Murino. Audio tracking in noisy environments by acoustic map and spectral signature. EEE Trans Cybern, 2018.
Victoria Dean, Shubham Tulsiani, and Abhinav Gupta. See, hear, explore: Curiosity via audio-visual association. Advances in Neural Information Processing Systems, 33, 2020.
Ivan Dokmanic, Reza Parhizkar, Andreas Walther, Yue M Lu, and Martin Vetterli. Acoustic echoes reveal room shape. Proceedings of the National Academy of Sciences, 110(30):12186-12191, 2013.
Itamar Eliakim, Zahi Cohen, Gabor Kosa, and Yossi Yovel. A fully autonomous terrestrial bat-like acoustic robot. PLoS computational biology, 14(9):e1006406, 2018.
Chuang Gan, Yiwei Zhang, Jiajun Wu, Boqing Gong, and Joshua B Tenenbaum. Look, listen, and act: Towards audio-visual embodied navigation. In 2020 IEEE International Conference on Robotics and Automation (ICRA), pp. 9701-9707. IEEE, 2020.

Chuang Gan, Hang Zhao, Peihao Chen, David Cox, and Antonio Torralba. Self-supervised moving vehicle tracking with stereo sound. In ICCV, 2019.
R. Gao, C. Chen, Z. Al-Halah, C. Schissler, and K. Grauman. VisualEchoes: Spatial image representation learning through echolocation. In ECCV, 2020.
Jort Gemmeke, Daniel Ellis, Dylan Freedman, Aren Jansen, Wade Lawrence, Channing Moore, Manoj Plakal, and Marvin Ritter. Audio set: An ontology and human-labeled dataset for audio events. In ICASSP, 2017.
Dimitrios Giannoulis, Emmanouil Benetos, Dan Stowell, Mathias Rossignol, Mathieu Lagrange, and Mark D. Plumbley. Detection and classification of acoustic scenes and events: An ieee aasp challenge. In IEEE Workshop on Applications of Signal Processing to Audio and Acoustics, 2013.
Saurabh Gupta, David Fouhey, Sergey Levine, and Jitendra Malik. Unifying map and landmark based representations for visual navigation. arXiv preprint arXiv:1712.08125, 2017.
R. Hartley and A. Zisserman. Multiple View Geometry in Computer Vision. 2004.
D. Jayaraman and K. Grauman. Learning to look around: Intelligently exploring unseen environments for unknown tasks. In CVPR, 2018.
H. Jeong and Y. Lam. Source implementation to eliminate low-frequency artifacts in finite difference time domain room acoustic simulation. Journal of the Acoustical Society of America, 2012.
Abhishek Kadian, Joanne Truong, Aaron Gokaslan, Alexander Clegg, Erik Wijmans, Stefan Lee, Manolis Savva, Sonia Chernova, and Dhruv Batra. Are we making real progress in simulated environments? measuring the sim2real gap in embodied visual navigation. arXiv preprint arXiv:1912.06321, 2019.
Hansung Kim, Luca Remaggi, Philip JB Jackson, Filippo Maria Fazi, and Adrian Hilton. 3d room geometry reconstruction using audio-visual sensors. In 2017 International Conference on 3D Vision (3DV), pp. 621-629. IEEE, 2017.
Chen-Yu Lee, Vijay Badrinarayanan, Tomasz Malisiewicz, and Andrew Rabinovich. Roomnet: End-to-end room layout estimation. In ICCV, 2017.
David B Lindell, Gordon Wetzstein, and Vladlen Koltun. Acoustic non-line-of-sight imaging. In Proceedings of the IEEE Conference on Computer Vision and Pattern Recognition, pp. 6780-6789, 2019.
Chen Liu, Jiaye Wu, and Yasutaka Furukawa. Floornet: A unified framework for floorplan reconstruction from 3d scans. In Proceedings of the European Conference on Computer Vision (ECCV), pp. 201-217, 2018.
Medhini Narasimhan, Erik Wijmans, Xinlei Chen, Trevor Darrell, Dhruv Batra, Devi Parikh, and Amanpreet Singh. Seeing the unscene: Learning amodal semantic maps for room navigation. arXiv preprint arXiv:2007.09841, 2020.
Brian Okorn, Xuehan Xiong, Burcu Akinci, and Daniel Huber. Toward automated modeling of floor plans. In 3DPVT, 2009.
Andrew Owens, Phillip Isola, Josh McDermott, Antonio Torralba, Edward H Adelson, and William T Freeman. Visually indicated sounds. In Proceedings of the IEEE conference on computer vision and pattern recognition, pp. 2405-2413, 2016.
Santhosh K Ramakrishnan, Ziad Al-Halah, and Kristen Grauman. Occupancy anticipation for efficient exploration and navigation. arXiv preprint arXiv:2008.09285, 2020.
J. Santos, D. Portugal, and R. Rocha. An evaluation of 2d slam techniques available in robot operating system. In IEEE International Symposium on Safety, Security, and Rescue Robotics (SSRR), 2013.
Nikolay Savinov, Alexey Dosovitskiy, and Vladlen Koltun. Semiparametric topological memory for navigation. arXiv preprint arXiv:1803.00653, 2018.
Manolis Savva, Abhishek Kadian, Oleksandr Maksymets, Yili Zhao, Erik Wijmans, Bhavana Jain, Julian Straub, Jia Liu, Vladlen Koltun, Jitendra Malik, et al. Habitat: A platform for embodied ai research. In Proceedings of the IEEE International Conference on Computer Vision, pp. 9339-9347, 2019.
S. Se, D. Lowe, and J. Little. Mobile robot localization and mapping with uncertainty using scale-invariant visual landmarks. IJRR, 2002.

(56) References Cited

OTHER PUBLICATIONS

Jascha Sohl-Dickstein, Santani Teng, Benjamin M Gaub, Chris C Rodgers, Crystal Li, Michael R DeWeese, and Nicol S Harper. A device for human ultrasonic echolocation. IEEE Transactions on Biomedical Engineering, 62(6):1526-1534, 2015.
Shuran Song, Andy Zeng, Angel X. Chang, Manolis Savva, Silvio Savarese, and Thomas Funkhouser. Im2pano3d: Extrapolating 360 structure and semantics beyond the field of view. In CVPR, 2018.
Julian Straub, Thomas Whelan, Lingni Ma, Yufan Chen, Erik Wijmans, Simon Green, Jakob J Engel, Raul Mur-Artal, Carl Ren, Shobhit Verma, et al. The replica dataset: A digital replica of indoor spaces. arXiv preprint arXiv:1906.05797, 2019.
Wei Sui, Lingfeng Wang, Bin Fan, Hongfei Xiao, Huaiyu Wu, and Chunhong Pan. Layer-wise floorplan extraction for automatic urban building reconstruction. IEEE Transactions on Visualization and Computer Graphics, 2016.
Cheng Sun, Chi-Wei Hsiao, Min Sun, and Hwann-Tzong Chen. Horizonnet: Learning room layout with 1d representation and pano stretch data augmentation. In CVPR, 2019.
Ashish Vaswani, Noam Shazeer, Niki Parmar, Jakob Uszkoreit, Llion Jones, Aidan N Gomez, Łukasz Kaiser, and Illia Polosukhin. Attention is all you need. In Advances in neural information processing systems, pp. 5998-6008, 2017.
Antonio Pico Villalpando, Guido Schillaci, Verena V Hafner, and Bruno Lara Guzmán. Ego-noise predictions for echolocation in wheeled robots. In Artificial Life Conference Proceed-ings, pp. 567-573. MIT Press, 2019.
S. Yang, F. Wang, C. Peng, P. Wonka, M. Sun, and H. Chu. Dula-net: A dual-projection network for estimating room layouts from a single rgb panorama. In CVPR, 2019.
Mao Ye, Yu Zhang, Ruigang Yang, and Dinesh Manocha. 3d reconstruction in the presence of glasses by acoustic and stereo fusion. In Proceedings of the IEEE Conference on Computer Vision and Pattern Recognition, pp. 4885-4893, 2015.
Zhoutong Zhang, Jiajun Wu, Qiujia Li, Zhengjia Huang, James Traer, Josh H McDermott, Joshua B Tenenbaum, and William T Freeman. Generative modeling of audible shapes for object perception. In Proceedings of the IEEE International Conference on Computer Vision, pp. 1251-1260, 2017.
Chuhang Zou, Alex Colburn, Qi Shan, and Derek Hoiem. Layoutnet: Reconstructing the 3d room layout from a single rgb image. In CVPR, 2018.
Chuhang Zou, Jheng-Wei Su, Chi-Han Peng, Alex Colburn, Qi Shan, Peter Wonka, Hung-Kuo Chu, and Derek Hoiem. 3d manhattan room layout reconstruction from a single 360 image. arXiv preprint arXiv:1910.04099, 2019.

\* cited by examiner

GENERATING DIGITAL FLOORPLANS FROM SPARSE DIGITAL VIDEO UTILIZING AN AUDIO-VISUAL FLOORPLAN RECONSTRUCTION MACHINE LEARNING MODEL

BACKGROUND

Recent years have seen significant improvements in computer systems that generate virtual models of three-dimensional spaces from input digital images. For example, conventional modeling systems can assimilate visual data from digital photos and/or video captured by three-dimensional cameras, spherical cameras, lidar cameras, or other capturing devices to generate a virtual digital representations of a real-world space. These virtual models can then be utilized to analyze the space remotely through various client devices.

Although conventional systems can generate virtual models of spaces depicted by digital images and video, such systems have a number of problems in relation to efficiency, flexibility, and accuracy of operation. For instance, with regard to efficiency, conventional systems often require massive amounts of input data in order to model a three-dimensional space. Specifically, conventional systems often require a high volume of pixel-dense images taken in a specific sequence in order to model the three-dimensional spaces portrayed in the images. This approach places exorbitant demands on implementing computing systems, including memory storage and processing power.

Moreover, conventional systems are also inflexible. Indeed, because conventional systems require a high-volume of digital images illustrating each area of a space, these systems cannot flexibly adapt to a variety of circumstances or inputs. For example, conventional systems are often unable to utilize sparse images or casual videos of a space to generate virtual models. Moreover, conventional systems rigidly generate models of only the viewed areas of the three-dimensional spaces—even when the three-dimensional spaces include additional areas that are not depicted in the input data. Accordingly, conventional systems are often limited to a very limited set of circumstances and implementation by a limited set of capturing and computing devices.

Conventional systems are also inaccurate in generating models of three-dimensional spaces. For example, conventional systems typically generate incomplete virtual models. To illustrate, when a conventional system generates a model of a three-dimensional space based on digital images of the space, it generally produces a model limited to the viewed areas within the digital images. Thus, if digital images fail to depict every area of a space, conventional system often generate a virtual model that is incomplete and inaccurate.

These along with additional problems and issues exist with regard to conventional systems.

BRIEF SUMMARY

Embodiments of the present disclosure provide benefits and/or solve one or more of the foregoing or other problems in the art with systems, non-transitory computer-readable media, and methods for utilizing visual and audio modalities to accurately generate two-dimensional floorplans of three-dimensional spaces. For example, the disclosed systems can extract both visual and audio information from sparse digital video coverage of portions of a three-dimensional space and utilize the extracted visual and audio information to generate a two-dimensional floorplan representing both viewed and unviewed portions of the three-dimensional space. Utilizing visual frames and digital audio, the disclosed systems can sense geometry outside of the field of view portrayed in the digital video and also reveal the existence of distant freespace and the presence of rooms not visible to a camera.

In one or more embodiments, the disclosed systems utilize an audio-visual floorplan reconstruction machine learning model that includes a novel multi-modal encoder-decoder framework. In particular, if the user has opted-in to such an extraction, the disclosed systems can utilize the audio-visual floorplan reconstruction machine learning model to extract and align visual and audio information from a digital video both spatially and temporally. With the visual and audio information thus aligned, the disclosed systems further utilize the audio-visual floorplan reconstruction machine learning model to generate encoded floorplan predictions based on the visual and audio information. Specifically, the disclosed systems can utilize self-attention layers that capture bi-directional relationships across digital video timesteps represented among the visual and audio information. Utilizing this deep learning approach, in one or more embodiments the disclosed systems combine floorplan predictions to generate a two-dimensional floorplan of both viewed and unviewed portions of the three-dimensional space depicted in the sparse digital video. Moreover, the disclosed systems can train audio-visual floorplan reconstruction machine learning model to predict both the interior structure of an environment as well as semantic room labels in generating a two-dimensional floorplan.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
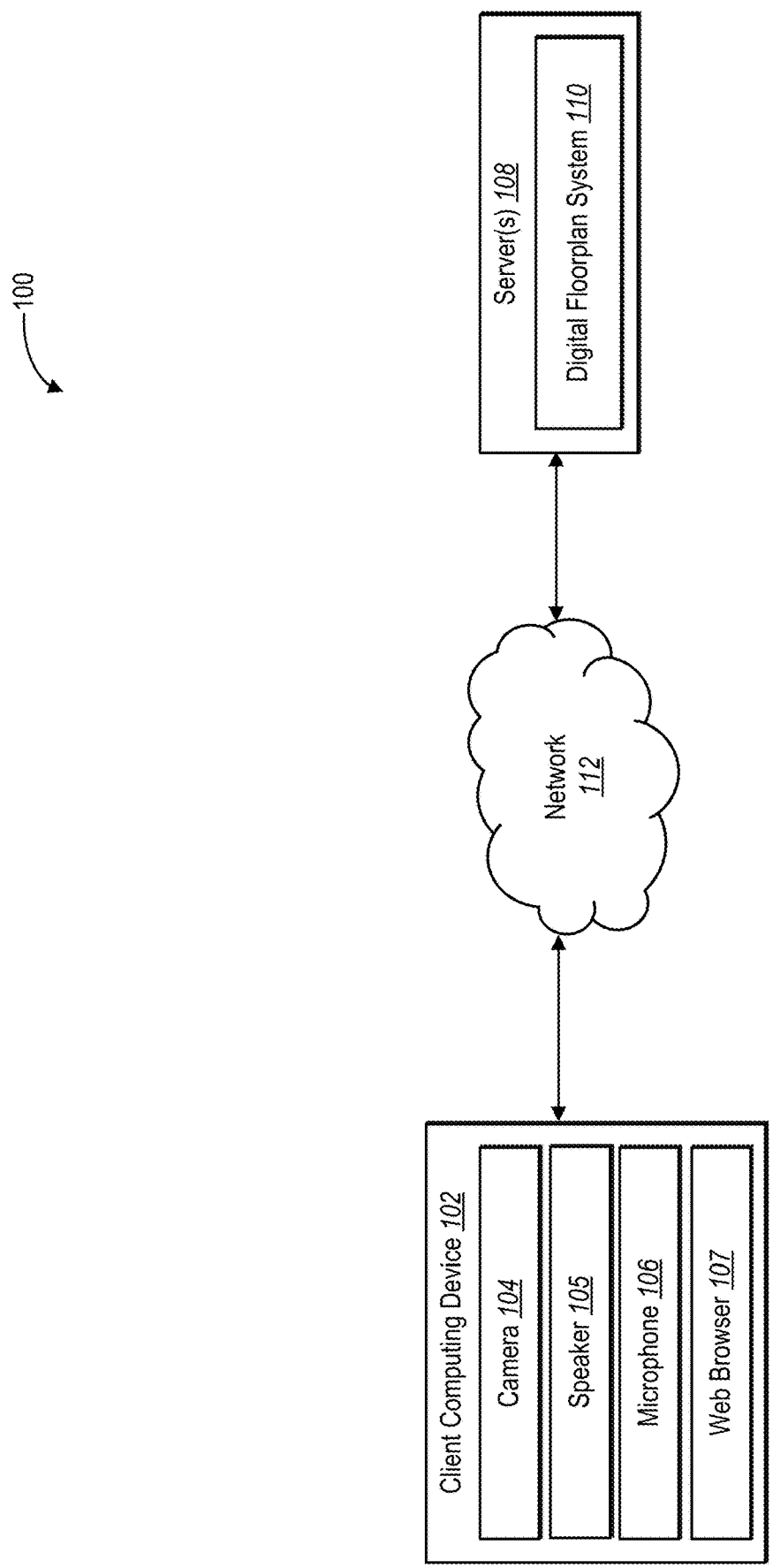
FIG. 1 illustrates a diagram of an environment in which a digital floorplan system can operate in accordance with one or more embodiments.

This disclosure describes one or more embodiments of a digital floorplan system that utilizes an audio-visual floorplan reconstruction machine learning model to generate two-dimensional floorplans utilizing both visual and audio information from sparse digital videos portraying three-dimensional spaces. For example, consistent with user consent and opt-in procedures, the digital floorplan system extracts visual features and audio features for each timestep represented in a sparse digital video of a three-dimensional space. The digital floorplan system separately encodes the visual and audio features to maintain information present in the entire sequence of timesteps, and then combines encodings of the visual and audio features across timesteps to generate floorplan predictions. Moreover, the digital floorplan system utilizes the floorplan predictions to generate a final two-dimensional floorplan associated with the three-dimensional space depicted in the sparse digital video. By utilizing both audio and visual information to generate the two-dimensional floorplan, the digital floorplan system intelligently infers both the dimensions and purposes of rooms within both viewed and unviewed portions of the three-dimensional space.

As just mentioned, the digital floorplan system can, based on user permission and consent, extract multiple modalities of information from a digital video of a three-dimensional space. For example, the digital floorplan system can identify visual and audio information from each timestep represented in the received digital video. In one or more embodiments, the digital floorplan system identifies this information from frame-audio sample pairs taken at each timestep (e.g., each digital video timestamp, each digital video frame, each time increment represented in the digital video). For example, the digital floorplan system can identify visual information from the visual frame (e.g., digital video frame) included in a frame-audio sample pair. The digital floorplan system can further identify audio information including both passive audio information (e.g., captured by a recording device) and active audio information (emitted from a speaker corresponding to the recording device) included in the frame-audio sample pair. The digital floorplan system can utilize naturally occurring semantic sounds and emitted sounds to understand a multi-room layout.

In one or more embodiments, upon obtaining user consent via opt-in procedures, the digital floorplan system further extracts features from the visual and audio information identified at each timestep. For example, the digital floorplan system can perform top-down feature extraction for both visual and audio features at each timestep. In one or more embodiments, the digital floorplan system extracts visual and audio features utilizing feature extraction layers of an audio-visual floorplan reconstruction machine learning model that project visual frames and audio clips from the digital video to a two-dimensional feature grid representing the two-dimensional floorplan of the three-dimensional space depicted in the digital video.

In order to accurately process a sequence of features representing timestep information, the digital floorplan system can align the extracted visual and audio features to a common coordinate system. For example, the digital floorplan system utilizes motion data corresponding to the digital video to translate and rotate visual and audio features within the two-dimensional feature grid. Thus, the digital floorplan system aligns the visual and audio features within the two-dimensional feature grid such that the features are located at positions that correspond with movement of a recording device while capturing the digital video within the three-dimensional space.

The digital floorplan system further encodes the aligned visual and audio features to account for information present in the entire sequence. For example, the digital floorplan system can utilize various convolutional self-attention layers within the audio-visual floorplan reconstruction machine learning model to analyze and leverage information between features at different timestamps. Thus, information represented in later features can influence information represented in earlier features, and vice versa. In one or more embodiments, the digital floorplan system encodes visual and audio features separately utilizing encoder layers of the audio-visual floorplan reconstruction machine learning model.

In one or more embodiments, the digital floorplan system generates audio-visual encodings by combining the encodings of the visual and audio features. For example, the digital floorplan system can generate an audio-visual encoding representing a particular timestep within the digital video by combining the visual and audio features for that timestep. The digital floorplan system further decodes these audio-visual encodings utilizing decoder layers of the audio-visual floorplan reconstruction machine learning model. Specifically, in one or more embodiments these decoding layers utilize additional self-attention layers to leverage bi-directional relationships between the audio-visual encodings across the represented timesteps.

In at least one embodiment, the digital floorplan system utilizes the decoder layers of the audio-visual floorplan reconstruction machine learning model to generate multi-channel floorplan predictions for each represented timestep. For example, the digital floorplan system can generate a floorplan prediction associated with a digital video timestep that includes a layout prediction of one or more rooms of the three-dimensional space depicted in the digital video in a first channel of the floorplan prediction. The digital floorplan system can further generate the floorplan prediction by utilizing additional channels of the floorplan prediction to generate one or more semantic room label predictions indicating classifications or purposes of the one or more rooms of the three-dimensional space.

As mentioned above, the digital floorplan system can further generate a final two-dimensional floorplan based on the floorplan predictions from various output channels. For example, the digital floorplan system can combine the layout predictions across generated floorplan predictions to determine a final layout. Similarly the digital floorplan system can combine semantic room label predictions to determine final semantic room labels. In one or more embodiments, the digital floorplan combines the final layout with the final semantic room labels to generate a two-dimensional floorplan that includes a visual representation of the rooms and walls of the three-dimensional space, along with a semantic room label (e.g., "Bathroom," "Kitchen," "Bedroom") for each room. In one or more embodiments, the digital floorplan system generates the two-dimensional floorplan such that it includes both viewed and unviewed portions of the three-dimensional space depicted in the initial digital video.

In one or more embodiments, the digital floorplan system enables user to opt-in to floorplan prediction services. For example, prior to identifying or otherwise capturing visual and audio information about a three-dimensional space, the digital floorplan system provides a graphical user interface (e.g., a popup window or other notification) including a statement informing a user of the kinds of data that will be collected (e.g., visual and audio data). The statement can further include information regarding how the collected data will be used (e.g., to create a two-dimensional floorplan of an indoor space). The digital floorplan system can proceed to collect audio and visual information to generate a two-dimensional floorplan based on the user's response to the options provided in connection with the graphical user interface. For example, if the user selects an affirmative option (e.g., "Proceed," "Yes," etc.), the digital floorplan system can continue to collect and utilize data from the user's client computing device. If the user selects a negative option (e.g., "No thanks," "Exit," etc.), the digital floorplan system can cancel and/or close.

As mentioned above, the digital floorplan system can provide many technical advantages and benefits over conventional modeling systems and methods. For example, the digital floorplan system can improve efficiency of implementing computing devices relative to conventional systems. In contrast to conventional modeling system that often require processing of hundreds or thousands of high-definition digital images in order to model a three-dimensional space, the digital floorplan system can generate a two-dimensional floorplan of a three-dimensional space from a sparse digital video across a low number of timesteps (e.g., less than five or ten). Accordingly, the digital floorplan system can require significantly less memory storage and processing power for implementing computing devices. Additionally, the digital floorplan system further avoids the system waste associated with specific capture devices (e.g., three-dimensional cameras, lidar scanners, etc.) that require high amounts of computational resources to capture, store, and send special-use images. Instead, the digital floorplan system generates accurate two-dimensional floorplans based on digital video taken by a variety of low-overhead capture devices, such as smartphones.

The digital floorplan system can also improve flexibility relative to conventional systems. For example, the digital floorplan system can avoid the rigidity of requiring high-quality digital images of an entire three-dimensional space in order to generate a digital floorplan. In contrast, the digital floorplan system can utilize a sparse digital video captured by a smartphone or other camera device, even if the digital video fails to depict all the areas of the three-dimensional space. Moreover, by utilizing both audio and visual data, the digital floorplan system can flexibly infer the existence and purpose of other areas in a three-dimensional space that are not portrayed in a digital video.

In addition to improving flexibility, the digital floorplan system can also improve accuracy compared to conventional systems. As mentioned above, conventional systems are often limited to modeling spaces that are depicted in input images and videos. Thus, if a three-dimensional space includes areas that are not depicted, a conventional system will often generate an inaccurate model of that space. By utilizing multiple modalities (e.g., visual and audio) to generate a two-dimensional floorplan of a three-dimensional space, the digital floorplan system rectifies these inaccuracies and generates a more accurate floorplan of the three-dimensional space that includes viewed areas as well as unviewed areas that are not depicted in the input digital video. Moreover, as mentioned above, the digital floorplan system can also generate semantic room labels, which conventional systems fail to provide.

In addition to the various technological advantages of the digital floorplan system discussed above, the digital floorplan system provides solutions across a range of applications and environments. For example, as discussed above, the digital floorplan system generates two-dimensional floorplans based on sparse digital video. Accordingly, the digital floorplan system can be utilized in connection with architectural applications. For instance, the digital floorplan system can generate an accurate two-dimensional floorplan of a home in a real estate application such that a realtor may utilize the two-dimensional floorplan in providing information about the home to prospective buyers.

In other embodiments, the digital floorplan system can generate and provide two-dimensional floorplans in connection with augmented reality and robotics applications. For example, within an augmented reality application, the digital floorplan system can quickly and accurately generate a two-dimensional floorplan (including a geometric layout and or semantic label) of a space in response to an augmented reality device (e.g., such as a headset) capturing a few frames of digital video within the space. The augmented reality application can then utilize the two-dimensional floorplan in positioning augmented reality artifacts, labeling a particular room for various functions of the augmented reality device (e.g., selecting or recommending augmented reality elements), and other augmented reality functionality. Moreover, within a robotics application, the digital floorplan system can similarly generate a two-dimensional floorplan of a space in response to a robotic device capturing sparse digital video of the space. The robotics application can then utilize the two-dimensional floorplan to help navigate the robotic device, and provide additional context to tasks that the robotic device may perform.

As illustrated by the foregoing discussed, the present disclosure utilizes a variety of terms to describe features and advantages of the digital floorplan system. Additional detail is now provided regarding the meaning of such terms. For example, as used herein, the term "digital video" refers to an electronic representation of visual images and corresponding audio over time. For instance, a digital video can include sequence of digital images captured at a frame rate such that when watched in succession, objects depicted in the digital images appear to move.

As used herein, the term "digital image" or "visual frame" refers to a digital visual representation (e.g., a digital representation of an image taken from a digital video). To illustrate, a digital image can include a digital image file (e.g., a ".jpg" file, a ".tiff" file, a ".gif" file, a ".png" file) with a length and a width and including areas of colored and/or grey scale pixels. In one or more embodiments, a digital image may be represented in Red-Green-Blue format (RGB format).

As used herein, an "audio clip" refers to digital audio information (e.g., that corresponds to a portion of time represented in a digital video). Audio clips may be in a variety of audio file formats (e.g., as a ".mp3" file, a ".wav" file, a ".mp4" file). In one or more embodiments, an audio clip can include passive audio and/or active audio. For example, passive audio can include sounds occurring within an environment beyond the recording device (e.g., people talking, phones ringing, footsteps falling), while active audio can include sounds emitting from and reverberating back to the recording device. In at least one embodiment, an audio clip can be an ambisonic audio clip including high-fidelity audio across two or more (e.g., up to nine) directional audio channels.

As used herein, the term "timestep" refers to an incremental change in time. For example, a timestep can be a fraction of a digital video recording taken within a three-dimensional space. In one or more embodiments, a digital video can include multiple timesteps that are lower in number than the number of frames in the digital video. Thus, a timestep may have a time duration associated with it, such as two seconds.

As used herein, a "frame-audio sample pair" refers to a digital video frame and audio clip that correspond to a timestep. For example, a digital video including five timesteps can includes five frame-audio sample pairs. In one or more embodiments, the length of the audio clip for a particular timestep is the same duration as the timestep. Thus, for example, a frame-audio sample pair for a timestep may include a single digital video frame and a two second audio clip.

As used herein, a "floorplan prediction" refers to estimated or expected information regarding a floorplan for a three-dimensional space. For example, a floorplan prediction may include scores or probabilities regarding the geometric layout of a three-dimensional space and/or a semantic label of areas within the three-dimensional space. In one or more embodiments, for example, a floorplan prediction includes a layout prediction and one or more semantic room label predictions. A layout prediction can include an estimated or expected geometric arrangement or layout of an interior space. A semantic room label prediction can include an estimated or expected classification of an interior space (e.g., a predicted class indicating a particular type of room). A floorplan prediction can include one or more score maps that correspond to locations within a three-dimensional space. As mentioned above, different channels of an audio-visual floorplan reconstruction machine learning model can generate different floorplan predictions.

As mentioned above, the digital floorplan system can generate a two-dimensional floorplan (e.g., from one or more floorplan predictions). A two-dimensional floorplan can include a two-dimensional (e.g., top-down) geometric layout of a three-dimensional space. A two-dimensional floorplan can also include semantic room labels. For example, the digital floorplan system can generate two-dimensional floorplans that indicate the position of walls and open space that make up rooms within a corresponding three-dimensional space. In one or more embodiments, the digital floorplan system also includes semantic room labels, such as "kitchen," "bedroom," "bathroom" for various areas within the three-dimensional space.

As mentioned, the digital floorplan system can train and utilize different machine learning models. For example, as will be discussed in greater detail below, the digital floorplan system can utilize machine learning models to generate a two-dimensional floorplan of a three-dimensional space. As used herein, the term "machine learning model" refers to a computational model that can be tuned (e.g., trained) based on inputs to approximate unknown functions (e.g., a neural network model, reinforcement learning model, regression learning model, or decision tree model).

As used herein a "neural network model" (or "neural network") refers to a machine learning model that utilizes interconnected artificial neurons (or layers) that communicate and learn to approximate complex functions and generate outputs based on a plurality of inputs provided to the model. In particular, a neural network model includes a computer-implemented algorithm that implements deep learning techniques to analyze inputs to make predictions. Neural networks can include supervised models that improve in accuracy by comparing generated predictions against ground truth data (e.g., ground truth annotations) and modifying internal parameters for subsequent predictions. Examples of neural network models include convolutional neural networks, deep convolutional neural networks, generative adversarial neural networks, and recurrent neural networks (e.g., an LSTM).

In one or more embodiments, the digital floorplan system utilizes an audio-visual floorplan reconstruction machine learning model. An audio-visual floorplan reconstruction machine learning model refers to a machine learning model that process audio and visual data to generate a floorplan. In some embodiments, an audio-visual floorplan reconstruction machine learning model includes feature extraction layers followed by an encoder-decoder architecture. As mentioned above, in some embodiments the audio-visual floorplan reconstruction machine learning model utilizes one or more self-attention layers. For example, a self-attention layer of a machine learning model can relate or analyze different portions of sequence in order to compute a representation of that sequence. Thus, a self-attention layer allows sequential inputs to interact with each other according to bi-directional relationships (e.g., backwards and forwards) in time within the sequence. To illustrate, the digital floorplan system can utilize one of the attention layers as described by Ashish Vaswani, Noam Shazeer, Niki Parmar, Jakob Uszkoreit, Llion Jones, Aidan N Gomez, Lukasz Kaiser, and Allia Polosukjin, *Attention Is All You Need*, Advances in Neural Information Processing Systems, 5998-6008 (2017), which is incorporated herein by reference in its entirety.

Relatedly, the term "train" (or learn) refers to utilizing information to tune or teach a machine learning model. The term "training" or "learning" (used as an adjective or descriptor, such as "training data set") refers to information or data utilized to tune or teach the machine learning model. In one or more embodiments, a machine learning model is trained utilizing ground truth data (e.g., inputs for which the outputs are already known). For example, a machine learning model is trained by utilizing the machine learning model to generate an training output based on a ground truth input. The training output is then compared to the ground truth output, and the machine learning model is tuned or adjusted based on the comparison. This cycle is repeated until a measure of loss is minimized and the machine learning model is considered to be trained.

FIG. 1 illustrates an example block diagram of a system environment 100 for implementing a digital floorplan system 110. As illustrated in FIG. 1, the environment 100 includes a client computing device 102 and server(s) 108, which are communicatively coupled through a network 112. As shown in FIG. 1, the client computing device 102 includes a camera 104, a speaker 105, a microphone 106, and a web browser 107. Thus, for example, the client computing device 102 can include AR glasses, a smartphone, a VR headset, a laptop, or other computing devices described below with regard to FIG. 13. Additionally shown in FIG. 1, the server(s) 108 includes the digital floorplan system 110.

The client computing device 102 and the server(s) 108 communicate via the network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

Although FIG. 1 illustrates a particular arrangement of the client computing device 102, the server(s) 108, and the network 112, various additional arrangements are possible. For example, the client computing device 102 may directly communicate with the digital floorplan system 110, bypassing the network 112. Further, the environment 100 can include any number of client computing devices communicating with the digital floorplan system 110. Additional details relating to the network 112 are explained below with reference to FIG. 13.

In one or more embodiments, the client computing device 102 includes a computing device that is capable of interacting with the digital floorplan system 110, such as by providing digital video of a three-dimensional space for modeling. For example, in some implementations, the client computing device 102 includes at least one of a smartphone, a tablet, a desktop computer, a laptop computer, a head-mounted-display device, or other electronic device. In some instances, the client computing device 102 includes one or more applications (e.g., the web browser 107 or other client application) that are capable of interacting with the digital floorplan system 110, such as by submitting digital video and receiving two-dimensional floorplans. For example, in some embodiments, a client application may include a software application installed on the client computing device 102. In other cases, however, the client application may include the web browser 107 or other application that accesses a software application hosted on the server(s) 108. Additionally or alternatively, the client application may include digital video capturing functionality that captures digital video in connection with the camera 104, speaker 105, and microphone 106 of the client computing device 102.

Moreover, in one or more embodiments, the digital floorplan system 110 (e.g., via the web browser 107 and/or a client application) may interact with the camera 104, speaker 105, and microphone 106 in capturing digital video of the three-dimensional space. For example, the digital floorplan system 110 can cause the speaker 105 to emit sounds while the camera 104 captures digital video and the microphone 106 captures digital audio.

As mentioned above, the system environment 100 includes the server(s) 108. In one or more embodiments, the server(s) 108 generate, store, receive, and/or transmit digital data, including digital videos, two-dimensional floorplans, and one or more machine learning models. To provide an illustration, the server(s) 108 can receive a digital video from the client computing device 102, and generate a two-dimensional floorplan of a three-dimensional space depicted in the digital video utilizing the one or more machine learning models. The server(s) 108 can also provide the generated two-dimensional floorplan to the client computing device 102 for display and additional interaction. Additionally or alternatively, the server(s) 108 can store digital videos and two-dimensional floorplans for later use, such as to train or tune one or more machine learning models. In one or more embodiments, the server(s) 108 comprises a data server. In some embodiments, the server(s) 108 comprises a communication server or a web-hosting server.

As mentioned above, before gathering audio or visual data, the digital floor plan system 110 will inform the user what data is being gathered and how that data will be used (e.g., audio and visual information will be collected to create a floorplan of an indoor space to provide the user with improved AR experiences). The digital floor plan system 110 will then ask the user to opt-in to such data collection before any information is gathered. Thus, the digital floor plan system 110 will operate consistent with user privacy permissions and opt-in procedures.

Although FIG. 1 illustrates the digital floorplan system 110 hosted by the server(s) 108, the functionality of the digital floorplan system 110 may reside elsewhere. For example, some or all of the functionality of the digital floorplan system 110 may be performed by digital floorplan applications on the client computing device 102. Thus, the client computing device 102 can generate and display two-dimensional floorplans in the absence of a network connection to the server(s) 108. Additionally or alternatively, the client computing device 102 can provide digital video of a three-dimensional space (e.g., captured by the camera 104) via the web browser 106 to the server(s) 108 via the network 110, and then receive and display (e.g., via the web browser 106) a two-dimensional floorplan of the depicted three-dimensional space generated by the digital floorplan system 110.

Figure 2:
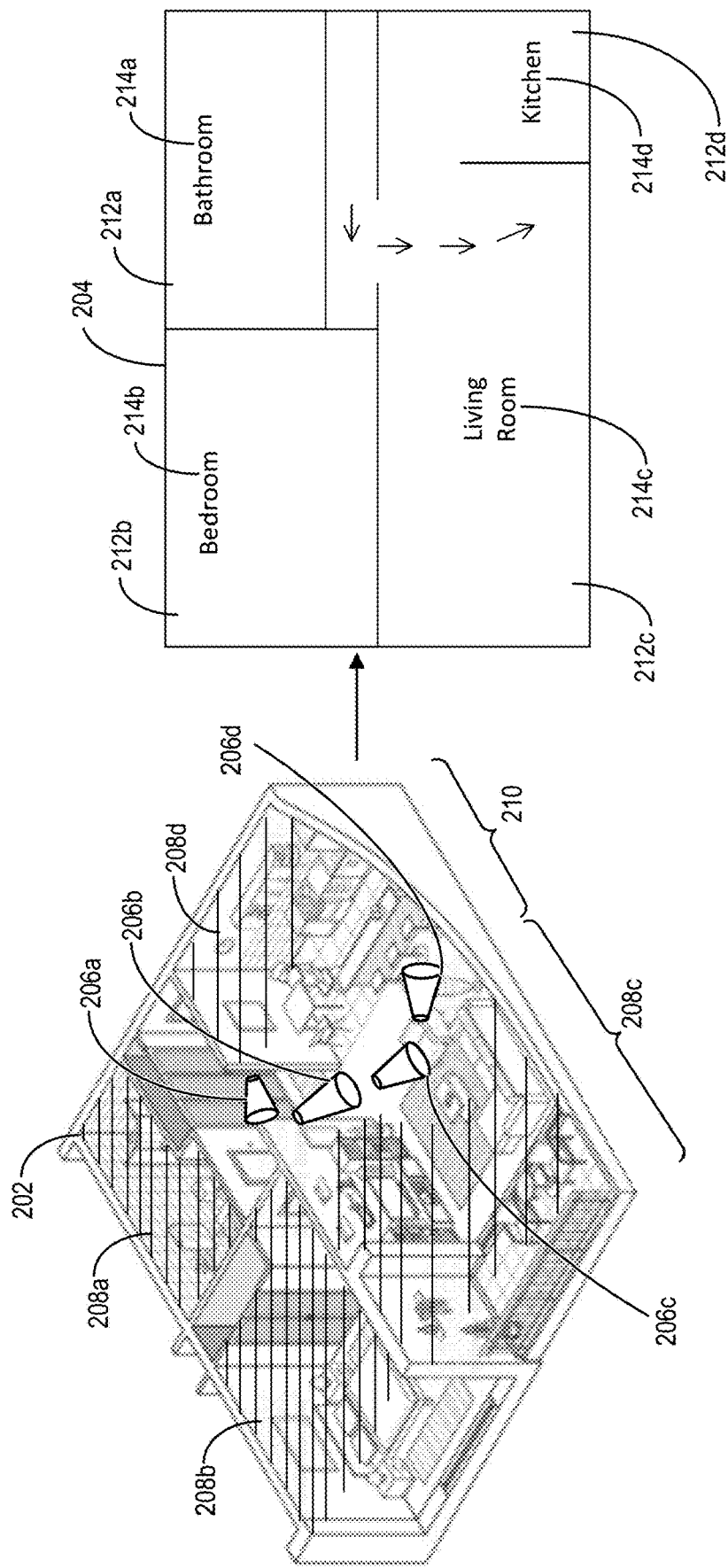
FIG. 2 illustrates an example of the digital floorplan system generating a two-dimensional floorplan of a three-dimensional space in accordance with one or more embodiments.

As mentioned above, the digital floorplan system 110 can generate a floorplan of a three-dimensional space. For example, FIG. 2 illustrates the digital floorplan system 110 generating a two-dimensional floorplan 204 of a three-dimensional space 202 in accordance with one or more embodiments. As shown in FIG. 2, the three-dimensional space 202 includes multiple rooms 208a, 208b, 208c, and 208e. Each of the rooms 208a-208e is associated with a particular class, purpose, or room type (e.g., bedroom, bathroom, living room, kitchen).

In one or more embodiments, and in response to determining an affirmative opt-in selection, the digital floorplan system 110 can capture and/or receive a digital video taken of the three-dimensional space 202 across different timesteps represented by the directional cones 206a, 206b, 206c, and 206d. To illustrate, the directional cones 206a-206d represent the position and direction of a recording device (e.g., the client computing device 102) capturing the digital video depicting portions of the three-dimensional space 202. Thus, at each represented timestep, the digital floorplan system 110 can identify a frame-audio sample pair including a digital video frame and an audio clip (e.g., an ambisonic audio clip). The digital video of the three-dimensional space 202 includes viewed portions 210 (e.g., the hallway, portions of the living room and kitchen), and unviewed portions (e.g., the bathroom, the bedroom, portions of the living room)—indicated by the hashed areas in the rooms 208a, 208b and portions of the rooms 206c and 206d.

In one or more embodiments, the digital floorplan system 110 generates the two-dimensional floorplan 204 of the three-dimensional space 202 by identifying frame-audio sample pairs from the digital video. For example, the digital floorplan system 110 can identify a frame-audio sample pair from each digital video timestep represented by the directional cones 206a-206d. Each frame-audio sample pair can include a digital video frame, and an audio clip that lasts the duration of the corresponding timestep. The digital floorplan system 110, consistent with user privacy permissions and opt-in procedures, further extracts visual features and audio features from the frame-audio sample pairs, and utilizes an audio-visual floorplan reconstruction machine learning model to generate the two-dimensional floorplan 204 based on the extracted visual and audio features.

As shown in FIG. 2, the digital floorplan system 110 generates the two-dimensional floorplan 204 including the approximate dimensions and locations of the rooms 212a, 212b, 212c, and 212d. Additionally, in one or more embodiments, the digital floorplan system 110 further generates the two-dimensional floorplan 204 including semantic room labels 214a, 214b, 214c, and 214d associated with each of the rooms 212a-212d. For example, the digital floorplan system 110 utilizes both the visual and audio information extracted from the digital video of the three-dimensional space 202 to determine and infer the dimensions and purposes of both the viewed and unviewed portions of the three-dimensional space 202 from the digital video. The digital floorplan system 110 further distills these dimensions and purposes into the two-dimensional floorplan 204, which includes indications of viewed portions 210 of the three-dimensional space 202 (e.g., the hallway, portions of the living room and kitchen), and unviewed portions of the three-dimensional space 202 (e.g., the bathroom, the bedroom, portions of the living room).

Figure 3:
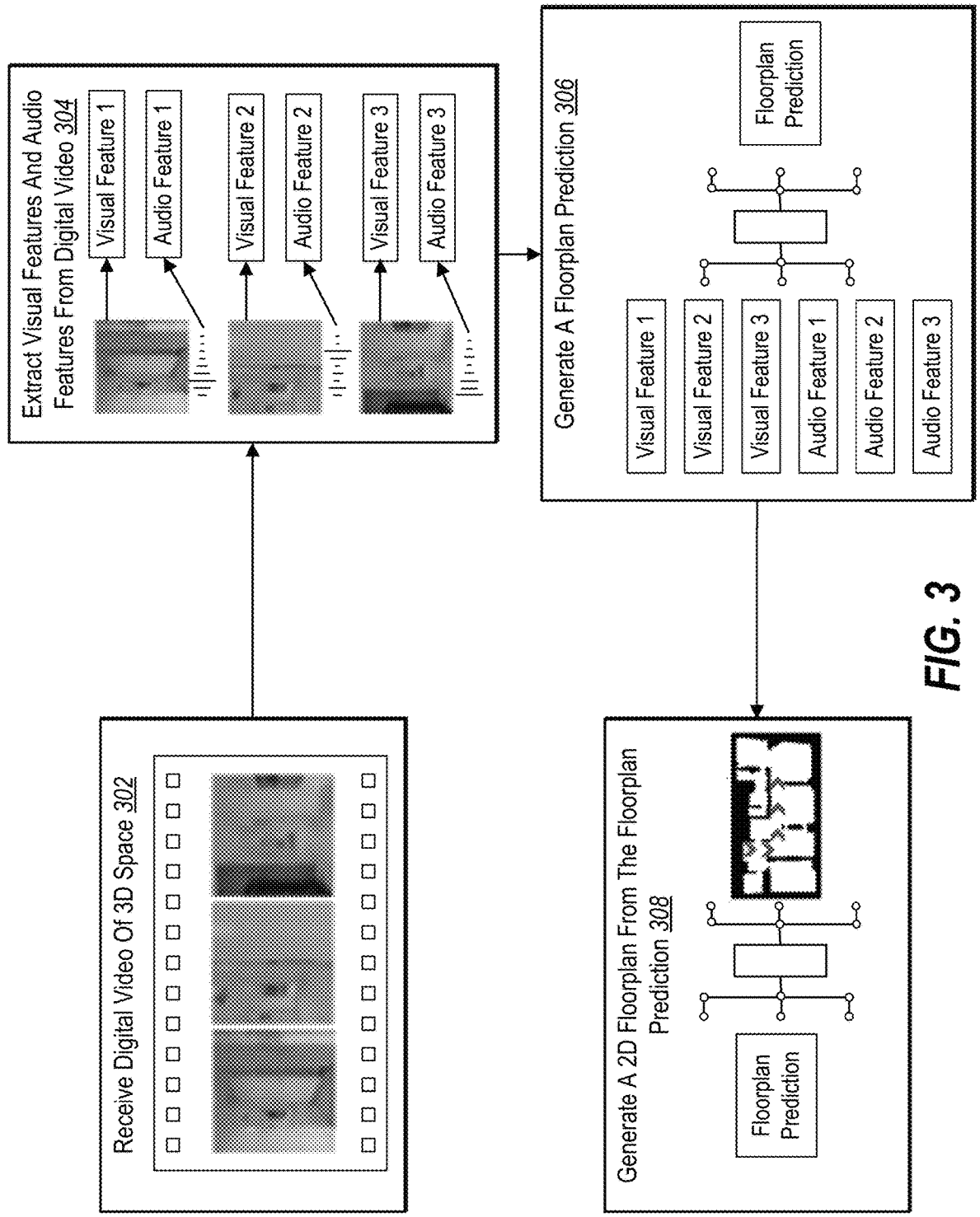
FIG. 3 illustrates a diagram of the digital floorplan system generating a two-dimensional floorplan of a three-dimensional space utilizing an audio-visual floorplan reconstruction machine learning model in accordance with one or more embodiments.

As mentioned above, the digital floorplan system 110 can generate a floorplan utilizing from a digital video utilizing an audio-visual floorplan reconstruction machine learning model. For example, FIG. 3 illustrates the digital floorplan system 110 generating a two-dimensional floorplan of a three-dimensional space by processing audio and visual features utilizing an audio-visual floorplan reconstruction machine learning model in accordance with one or more embodiments. For example, the digital floorplan system 110 can perform an act 302 of receiving a digital video depicting a three-dimensional space. In one or more embodiments, the digital floorplan system 110 receives the video including audio and visual information across a number of timesteps, where the audio and visual information is associated with both viewed and unviewed portions of the three-dimensional space. Additionally, in at least one embodiment, the digital floorplan system 110 receives the video after determining that the two-dimensional floorplan generation process has been opted into and/or approved by one or more users.

The digital floorplan system 110 further performs an act 304 (if the user has opted-in to such an act) of extracting visual features and audio features from the digital video. For example, the digital floorplan system 110 extracts visual features from visual frames in each frame-audio sample pair of the digital video. The digital floorplan system 110 further extracts audio features from audio clips in each frame-audio sample pair associated with the timesteps of the digital video. In one or more embodiments, the digital floorplan system 110 utilizes visual and audio extraction layers of an audio-visual floorplan reconstruction machine learning model that project the visual frames and audio clips to a two-dimensional feature grid representing the two-dimensional floorplan of the three-dimensional space depicted in the digital video. In at least one embodiment, the digital floorplan system 110 further utilizes motion data corresponding to the digital video (e.g., the motion of the client computing device 102 as it captured the digital video) to align the visual and audio features to a common coordinate system within the two-dimensional feature grid.

With the visual and audio features extracted and aligned, the digital floorplan system 110 performs an act 306 of generating a floorplan prediction. For example, the digital floorplan system 110 utilizes a sequence encoder-decoder architecture of the audio-visual floorplan reconstruction machine learning model to separately generate visual and audio encodings. In one or more embodiments, the sequence encoder generates the encodings to reflect bi-directional relationships among the visual features and audio features, respectively. In at least one embodiment, sequence encoder includes one or more self-attention layers that, in each encoding, account for information present in the entire sequence.

While the digital floorplan system 110 generates the encodings of the visual and audio features separately, the digital floorplan system 110 further utilizes a sequence decoder of the sequence encoder-decoder architecture in connection with combinations of the visual and audio encodings. For example, the digital floorplan system 110 generates these audio-visual encodings by combining the visual encodings and the audio encodings across the represented timesteps. In one or more embodiments, the sequence decoder includes one or more self-attention layers that further maintain information present across the entire sequence. In at least one embodiment, the sequence decoder of the audio-visual floorplan reconstruction machine learning model outputs one or more floorplan predictions.

The digital floorplan system 110 further performs an act 308 of generating a two-dimensional floorplan from the one or more floorplan predictions. For example, the digital floorplan system 110 combines the one or more floorplan predictions utilizing one or more layers of the audio-visual floorplan reconstruction machine learning model. In one or more embodiments, the floorplan predictions are multi-channeled. Thus, in at least one embodiment, the digital floorplan system 110 generates the two-dimensional floorplan by combining the various channels of the floorplan predictions. In this way, the digital floorplan system 110 can generate the two-dimensional floorplan including layout (e.g., the walls and dimensions of the three-dimensional space) and one or more semantic room labels indicating the types of rooms included in the interior.

Figure 4:
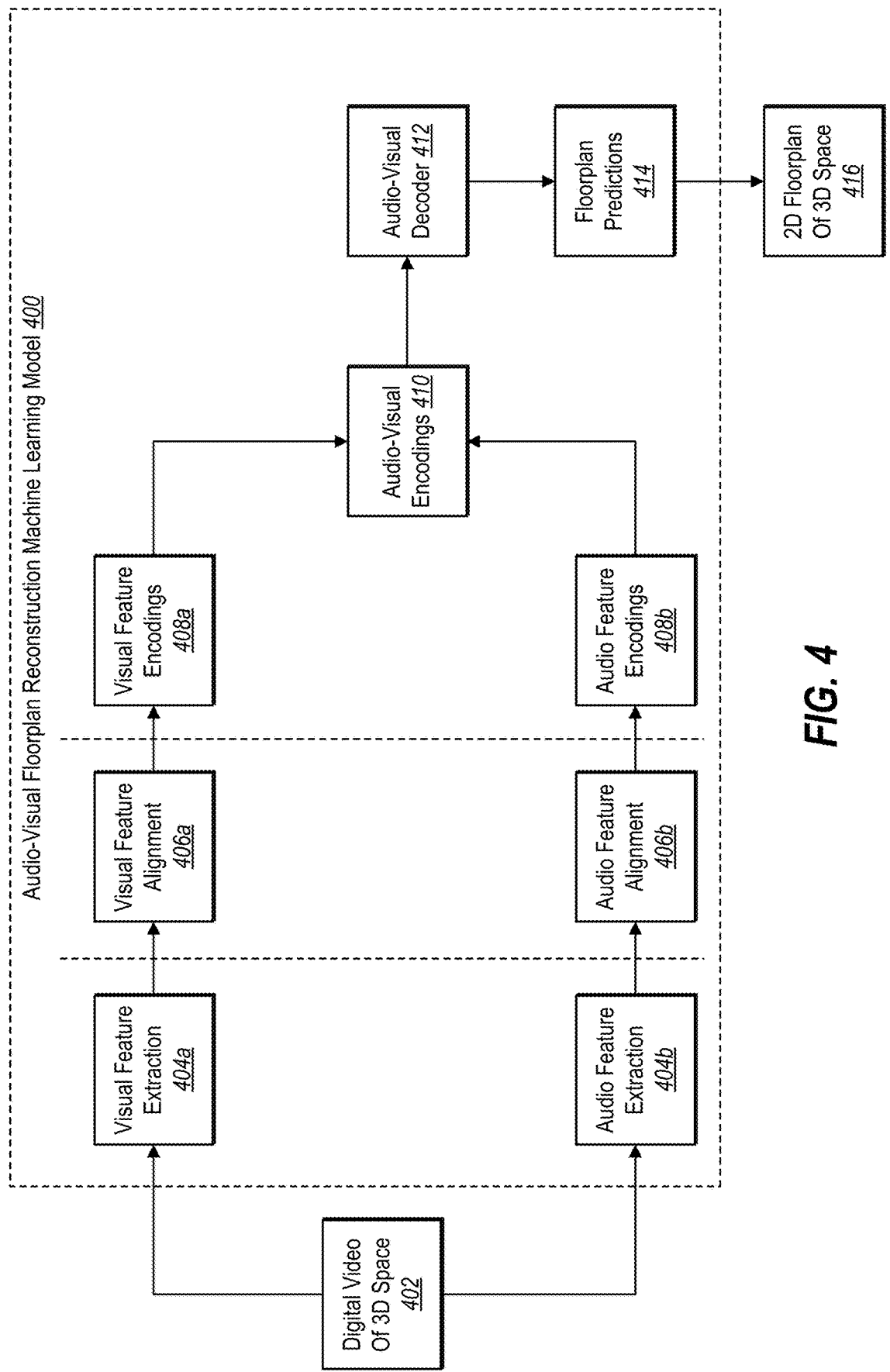
FIG. 4 illustrates a sequence diagram of the digital floorplan system generating a two-dimensional floorplan of a three-dimensional space depicted in a sparse digital video utilizing an audio-visual floorplan reconstruction machine learning model in accordance with one or more embodiments.

FIG. 4 illustrates the digital floorplan system 110 generating a two-dimensional floorplan of a three-dimensional space depicted in a sparse digital video utilizing layers of an audio-visual floorplan reconstruction machine learning model. For example, the digital floorplan system 110 receives a digital video 402 depicting a three-dimensional space. More specifically, the digital floorplan system 110 receives the digital video 402 including frame-audio sample pairs (e.g., visual frames and corresponding audio clips) across a number of timesteps. In at least one embodiment, the digital video 402 further includes motion data (e.g., position, location, rotation data) associated with how a recording device that captured the digital video 402 (e.g., the camera 104 of the client computing device 102) moved while capturing the digital video 402 across the timesteps.

In one or more embodiments, the digital floorplan system 110 receives the digital video 402 as an internet submission (e.g., via the web browser 106 on the client computing device 102). Additionally or alternatively, the digital floorplan system 110 receives the digital video 402 directly from the recording device that captured the digital video 402. For example, the digital floorplan system 110 may be part of a native application installed on the client computing device 102 where it receives the digital video 402 directly from the camera 104 as the digital video 402 is being captured. Additionally or alternatively, the digital floorplan system 110 receives the digital video 402 from a digital floorplan application or other dedicated application on the client computing device 102.

The digital video can also include motion information regarding the digital camera. For example, this motion information can include rotation, position, velocity, acceleration, or other details regarding movement of a camera utilized to capture the digital video. The digital floorplan system 110 can capture this motion information using an inertial measurement device, accelerometer, or other sensor associated with the camera device. Moreover, the digital floorplan can also determine or generate the motion information by analyzing digital images within the digital video.

The digital audio of the digital video can include ambisonic audio captured by an ambisonic microphone. To illustrate, the digital floorplan system 110 can utilize digital videos generated by a camera and an ambisonic microphone following short trajectories through various home environments. An ambisonic mic captures omnidirectional multi-channel audio. The digital floorplan system 110 represent a video by $V=\{(v_1, a_1), (v_2, a_2)\}$ where $v_t$ is the RGB frame and $a_t$ is the audio clip sampled at time step t. Additionally, the digital floorplan system 110 can denote $P_V=\{0, r_2, r_3\}$ as the position of the camera and microphone relative to the first time step in the coordinate system of the floorplan, where $r_i=\{0, x_i, y_i, \theta_i\}$ represents the movement along the x- and y-axis on the 2D ground plane and $\theta_i$ represents the rotation about the gravity axis. Relative pose changes in a video can be estimated using computer vision, for example, as described by R. Hartley and A. Zisserman in *Multiple View Geometry in Computer Vision* (2004).

In response to receiving the digital video 402, the digital floorplan system 110 can utilize an audio-visual floorplan reconstruction machine learning model 400 to generate a two-dimensional floorplan 416 of the three-dimensional space depicted in the digital video 402. As shown in FIG. 4, the digital floorplan system 110 utilizes multiple layers of the audio-visual floorplan reconstruction machine learning model 400 to extract features from the frame-audio sample pairs of the digital video 402, and align the extracted features. The digital floorplan system 110 further utilizes additional layers of the audio-visual floorplan reconstruction machine learning model 400 to encode and then decode the aligned features in order to generate one or more floorplan predictions 414. Finally, the digital floorplan system 110 generates the two-dimensional floorplan 416 based on the one or more floorplan predictions 414.

In one or more embodiments, the digital floorplan system 110 parameterizes each floorplan utilizing two variables: $M_{int}$ and $M_{room}$, which represent the structure and semantics, respectively. The layout or interior map $M_{int}$ can include a 2D binary grid that is a top-down view of the environment and represents the existence of floor, objects, furniture by label 1, and walls and areas outside the environment by label 0. The room map $M_{room}$ can include a 2D grid taking $N_r+1$ possible values with labels $\{1, \ldots, N_r\}$ representing the Nr room types (kitchen, bathroom, etc.) and 0 representing walls and areas outside the environment. Each cell in the floorplan (an entry in the matrix M) represents a particular area (e.g., 25 square centimeters).

The digital floorplan system 110 can learn a mapping F that estimates the floorplan (both $M_{int}$ and $M_{room}$) of an environment using the video V and the relative pose changes $P_V$. The visual information in $v_t$ captures the geometric properties and room types of visible regions. The audio information captured in $a_t$ is either actively emitted by the camera, or else passively generated by objects and people in the environment. Because the placement of objects is highly correlated with room types (for example, showers are in bathrooms and dishwashers are in kitchens), the audio signal captures a strong semantic signal indicating the room types. Furthermore, the echoes propagating through the environment capture geometric properties of the walls and other major surfaces. Accordingly, the audio observations will illuminate the map for regions beyond what is visible in the frames of a short video.

In more detail, and as shown in FIG. 4, the digital floorplan system 110 utilizes layers of the audio-visual floorplan reconstruction machine learning model 400 to perform mirrored tasks in connection with visual features and audio features. For example, the digital floorplan system 110 utilizes layers of the audio-visual floorplan reconstruction machine learning model 400 to perform visual feature extraction 404a and audio feature extraction 404b. More specifically, the digital floorplan system 110 utilizes convolutional layers and upsampling layers of the audio-visual floorplan reconstruction machine learning model 400 to extract visual features from the frame-audio sample pairs of the digital video 402. Moreover, the digital floorplan system 110 utilizes convolutional layers and upsampling layers of the audio-visual floorplan reconstruction machine learning model 400 to extract audio features from the frame-audio sample pairs of the digital video 402. The digital floorplan system 110 can utilize the audio-visual floorplan reconstruction machine learning model 400 to perform visual feature extraction 404a and audio feature extraction 404b in parallel or in sequence. Additional detail regarding feature extraction is provided below (e.g., in relation to FIG. 5).

Similarly, the digital floorplan system 110 can utilize layers of the audio-visual floorplan reconstruction machine learning model 400 to align the extracted visual and audio features. For example, the digital floorplan system 110 can utilize the audio-visual floorplan reconstruction machine learning model 400 to perform visual feature alignment 406a and audio feature alignment 406b in parallel or in sequence. In one or more embodiments, the digital floorplan system 110 utilizes the audio-visual floorplan reconstruction machine learning model 400 to perform visual feature alignment 406a and audio feature alignment 406b such that visual and audio features are positioned within a two-dimensional feature map to represent the motion data corresponding to the digital video 402. More specifically, the digital floorplan system 110 can apply the movement vector, $r_i$, to extracted features at each time step to align the features to a common spatial coordinate system (rather than a frame-centric coordinate system). Through feature extraction and alignment, the digital floorplan system 110 projects egocentric visual frames and ambisonic audio clips to a 2D feature grid that is spatially aligned with the top-down floorplan estimated at each time step. Additional detail regarding alignment of these feature vectors is provided below (e.g., in relation to FIG. 5).

Additionally, the digital floorplan system 110 can utilize layers of the audio-visual floorplan reconstruction machine learning model 400 to generate visual feature encodings 408a and audio feature encodings 408b. For example, the digital floorplan system 110 utilizes the audio-visual floorplan reconstruction machine learning model 400 to generate the visual feature encodings 408a and the audio feature encodings 408b such that the encodings 408a, 408b reflect bi-directional relationships among the sequences of visual and audio features. Specifically, the digital floorplan system 110 can utilize self-attention layers and convolutional layers to transform the visual and audio features to the encodings 408a, 408b. Accordingly, information in a second audio-visual sample pair in the sequence of sample pairs of the digital video 402 informs features of the visual and audio features associated with a first audio-visual sample pair in the same sequence, and vice versa. Utilizing this approach, the appearance of a wall in a second frame will inform features in a first frame and vice versa. Additional detail regarding utilizing self-attention layers to generate encodings is provided below (e.g., in relation to FIG. 6).

Up to this point, the digital floorplan system 110 utilizes layers of the audio-visual floorplan reconstruction machine learning model 400 to process the audio features and visual features separately. After generating the visual feature encodings 408a and the audio feature encodings 408b, the digital floorplan system 110 generates audio-visual encodings 410 by combining the visual feature encodings 408a and audio feature encodings 408b. In one or more embodiments, the digital floorplan system 110 utilizes the audio-visual encodings 410 in connection with an audio-visual decoder 412 of the audio-visual floorplan reconstruction machine learn model 400 to allow for cross-modal information transfer. In one or more embodiments, the digital floorplan system 110 utilizes layers of the audio-visual decoder 412 to further reflect the bi-directional relationships among the audio-visual encodings 410 across the timesteps represented in the digital video 402. Specifically, the digital floorplan system 110 applies additional self-attention layers and convolutional layers within the audio-visual decoder 412. In at least one embodiment, the audio-visual decoder 412 outputs one or more floorplan predictions 414. Additional detail regarding this decoding process is described below (e.g., in relation to FIG. 7).

In one or more embodiments, the digital floorplan system 110 generates the floorplan predictions 414 including multiple channels of predictions. For example, the digital floorplan system 110 can generate a single floorplan prediction including a layout prediction and one or more semantic room label predictions. To illustrate, the layout prediction can include a visual floorplan of one or more rooms of the three-dimensional space depicted in the digital video 402. Additionally, the one or more semantic room label predictions can each include a prediction that a specific type of room (e.g., "kitchen," "bathroom," "bedroom") exists within the layout prediction. In one or more embodiments, these predictions comprise maps (e.g., binary maps or probability maps), where each entry reflects a prediction (e.g., binary or probability prediction) that a corresponding location within the three-dimensional space corresponds to a particular layout (e.g., internal or external layout) or semantic room label.

The digital floorplan system 110 then combines the one or more floorplan predictions 414 to generate the two-dimensional floorplan 416. For example, the digital floorplan system 110 can generate the two-dimensional floorplan 416 by combining layout predictions from the one or more floorplan predictions, and combining the one or more semantic room label predictions from the one or more floorplan predictions. To illustrate, the digital floorplan system 110 can utilize a max pooling layer to combine entries within floorplan prediction maps reflecting predictions for individual areas within the three-dimensional space. The digital floorplan system 110 further generates the two-dimensional floorplan 416 by aggregating or otherwise concatenating the resulting combined layout predictions with the combined semantic room label predictions. Thus, the digital floorplan system 110 generates the two-dimensional floorplan 416 including a layout of the three-dimensional space depicted in the digital video 402 along with semantic room labels positioned over the layout to indicate the rooms included therein. Additional detail regarding generating the two-dimensional floorplan from audio-visual encodings is provided below (e.g., in relation to FIG. 7).

Figure 5:
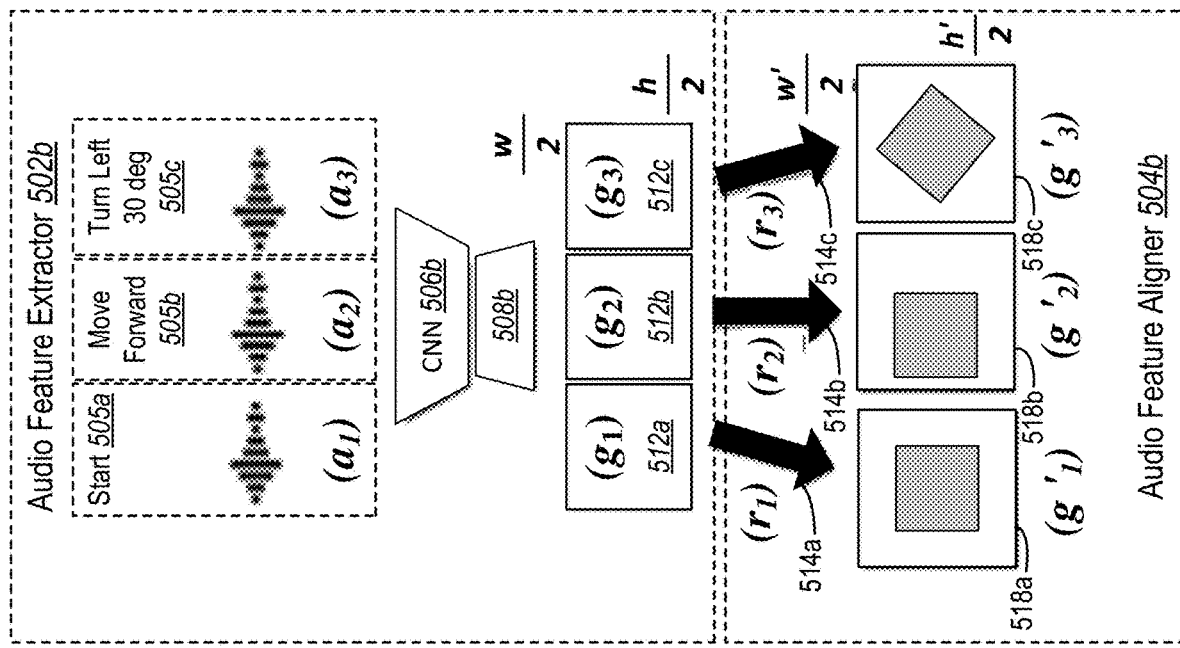
FIG. 5 illustrates diagrams of feature extractors and aligners of the audio-visual floorplan reconstruction machine learning model in accordance with one or more embodiments.
Figure 5:
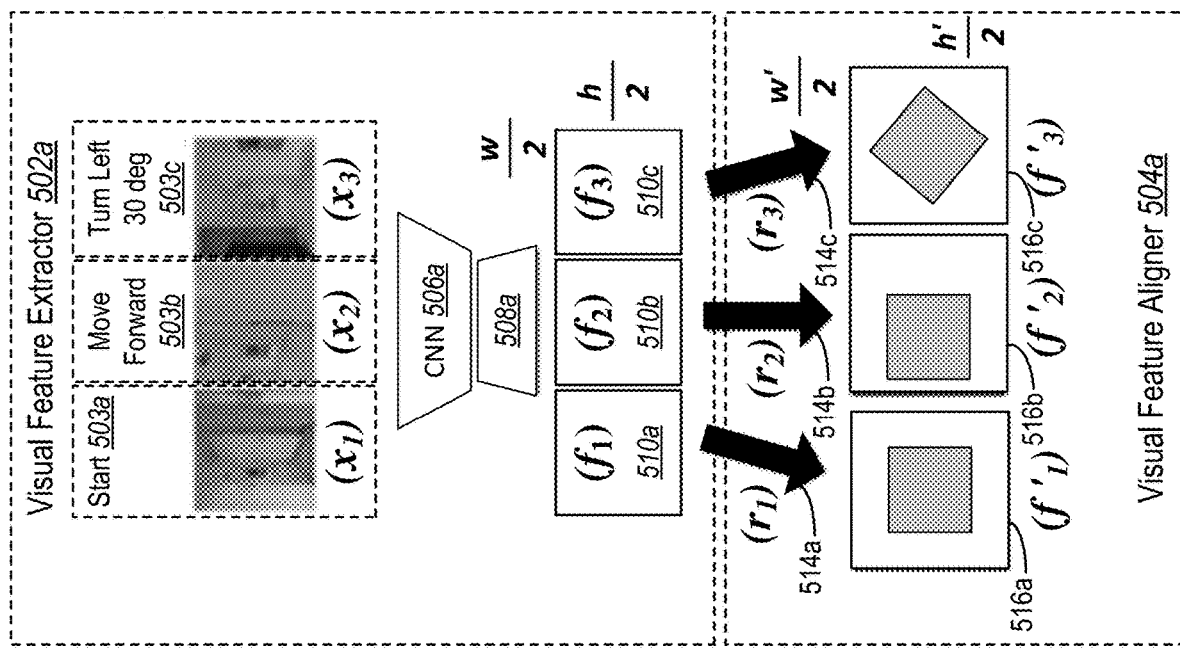
Figure 6:
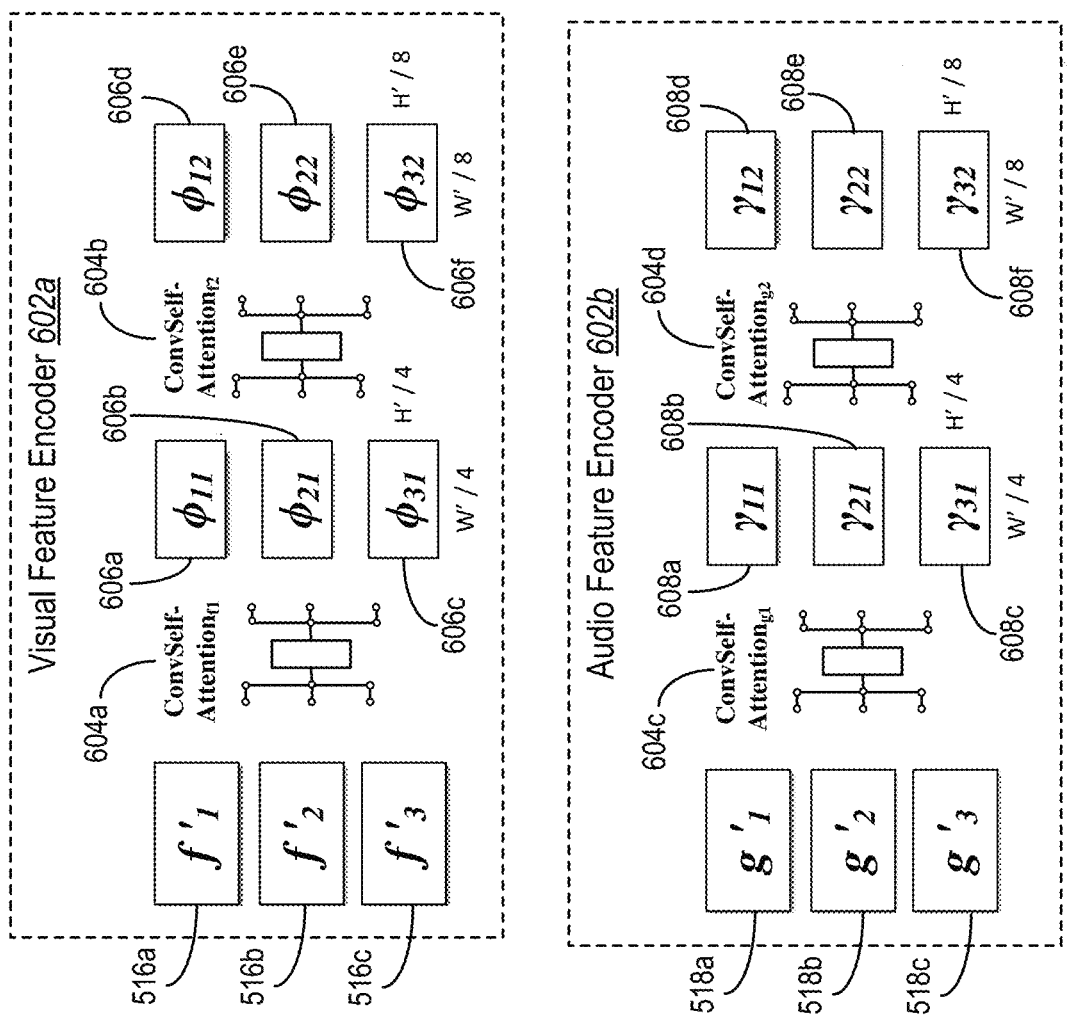
FIG. 6 illustrates diagrams of feature encoders of the audio-visual floorplan reconstruction machine learning model in accordance with one or more embodiments.
Figure 7:
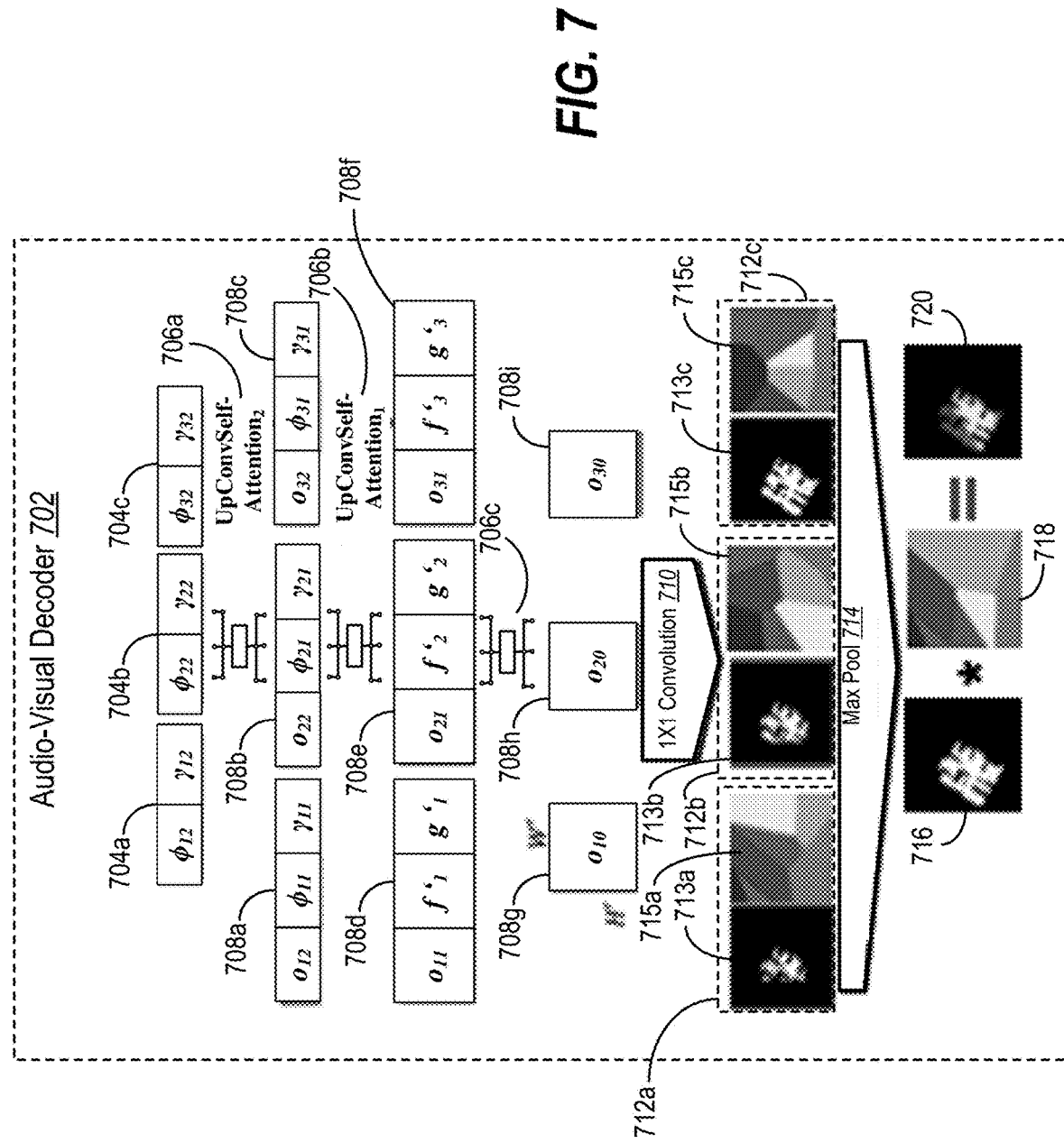
FIG. 7 illustrates a diagram of an audio-visual decoder of the audio-visual floorplan reconstruction machine learning model in accordance with one or more embodiments.

As just mentioned, FIGS. 5-7 illustrate additional features of the audio-visual floorplan reconstruction machine learning model 400. For example, FIG. 5 illustrates feature extractors and aligners of the audio-visual floorplan reconstruction machine learning model 400. Additionally, FIG. 6 illustrates encoders of the audio-visual floorplan reconstruction machine learning model 400, while FIG. 7 illustrates an audio-visual decoder of the audio-visual floorplan reconstruction machine learning model 400.

In more detail, with regard to FIG. 5, the audio-visual floorplan reconstruction machine learning model 400 includes a visual feature extractor 502a and an audio feature extractor 502b. As mentioned above, the feature extractors 502a, 502b separately extract visual and audio features from frame-audio sample pairs of a received digital video (e.g., the digital video 402 discussed above with reference to FIG. 4). For example, each frame-audio sample pair includes a digital video frame and an audio clip corresponding to a timestep of the digital video. Thus, the frame-audio sample pairs shown in FIG. 5 include: the digital video frame 503a ($x_1$) and the audio clip 505a ($a_1$); the digital video frame 503b ($x_2$) and the audio clip 505b ($a_2$); and the digital video frame 503c ($x_3$) and the audio clip 505c ($a_3$).

As further shown in FIG. 5, both of the feature extractors 502a, 502b process the digital video frames 503a-503c and audio clips 505a-505c utilizing layers of neural networks. For example, the visual feature extractor 502a processes the digital video frames 503a-503c first utilizing a convolutional neural network 506a, followed by an upsampling layer 508a. In one or more embodiments, the convolutional neural network 506a includes a neural network followed by a spatial pooling operation. For instance, in at least one embodiment, the convolutional neural network 506a includes a ResNet-18 model up to layer2, followed by the spatial pooling operation, which outputs a single 128-D feature. This resulting feature represents the information depicted in the corresponding digital video frame.

The visual feature extractor 502a then includes the upsampling layer 508a. For example, the upsampling layer 508a can include a sequence of transposed convolutions that gradually increase the dimensions of the 128-D feature generated by the convolutional neural network 506a. For example, the upsampling layer 508a generates: the visual feature 510a ($f_1$) corresponding to the digital video frame 503a ($x_1$); the visual feature 510b ($f_2$) corresponding to the digital video frame 503b ($x_2$); and the visual feature 510c ($f_3$) corresponding to the digital video frame 503c ($x_3$). In one or more embodiments, the upsampling layer 508a generates the visual features 510a-510c such that each visual feature is an element of $$\mathbb{R}^{128 \times \frac{H}{2} \times \frac{W}{2}},$$

where H, W are the height and width of the considered output floorplan area at each timestep. In one or more embodiments, this predicted floorplan area extends beyond the free space directly observable from the corresponding visual frame.

As further shown in FIG. 5, the audio feature extractor 502b similarly includes a convolutional neural network 506b followed by an upsampling layer 508b. In one or more embodiments, the convolutional neural network 506b of the audio feature extractor 502b includes different layers than the convolutional neural network 506a of the visual feature extractor 502a. For example, the convolutional neural network 506b can include a sequence of linear, ReLU, and pooling layers, yielding a 128-D feature. Thus, the convolutional neural network 506b utilizes each of the audio clips 505a-505c to generate corresponding 128-D features. In at least one embodiment, each of the audio clips 505a-505c are elements of $\mathbb{R}^{T \times 9}$, where T is the sound duration of the audio clip and 9 is the number of ambisonic channels corresponding to second order ambisonics.

Following the convolutional neural network 506b, and similar to the visual feature extractor 502a, the audio feature extractor 502b includes an upsampling layer 508b. As with the upsampling layer 508a, the upsampling layer 508b can include a sequence of transposed convolutions that gradually increase the dimensions of the 128-D feature generated by the convolutional neural network 506b. The resulting audio features 512a, 512b, and 512c are also elements of $$\mathbb{R}^{128 \times \frac{H}{2} \times \frac{W}{2}}.$$

At this point, the digital video (e.g., the digital video 402) is represented by the set of visual features 510a-510c and audio features 512a-512c, where the digital video includes 3 timesteps. While the visual and audio feature extractors 502a, 502b are shown in FIG. 5 in connection with a digital video with 3 timesteps, it will be noted that the feature extractors 502a, 502b can extract features from a digital video with any number of timesteps. Additionally, the feature extractors 502a, 502b generates the visual features 510a-510c and audio features 512a-512c such that they are aligned with a two-dimensional feature grid aligned to a frame-centric coordinate system.

Accordingly, as shown in FIG. 5, the audio-visual floorplan reconstruction machine learning model 400 includes a visual feature aligner 504a and an audio feature aligner 504b in order to align the visual features 510a-510c and audio features 512a-512c to a common coordinate system that reflects movement of the recording device through the three-dimensional space while capturing the digital video. In one or more embodiments, each of the aligners 504a, 504b include the same architecture and first concatenate each of the visual features 510a-510c and audio features 512a-512c, respectively, with a 64-channel two-dimensional positional encoding map. In at least one embodiment, the 64-channel two-dimensional positional encoding map represents the position of each pixel (e.g., in a digital video frame) with a 64-dimensional vector. To illustrate, for position (i,j) in the two-dimensional feature map, the positional encoding PE(i, j) is computed as:

$$PE(i) = \left[ \sin\left(\frac{i}{10000^{0/32}}\right), \cos\left(\frac{i}{10000^{0/32}}\right), \sin\left(\frac{i}{10000^{2/32}}\right), \cos\left(\frac{i}{10000^{2/32}}\right), \ldots \sin\left(\frac{i}{10000^{30/32}}\right), \cos\left(\frac{i}{10000^{30/32}}\right) \right]$$

$$PE(i, j) = [PE(i), PE(j)]$$

The aligners 504a, 504b further align the visual features 510a-510c and audio features 512a-512c, respectively, by padding each of the features 510a-510c and 512a-512c with zeros, and translating and rotating each of the features 510a-510c and 512a-512c based on motion data corresponding to the digital video. For example, the aligners 504a, 504b can determine positional vector 514a ($r_1$), positional vector 514b ($r_2$), and positional vector 514c ($r_3$), based on motion data provided with the digital video (e.g., metadata reflecting gyroscopic and accelerometer data), and/or based on an analysis of movement from the digital video frames in the digital video. For example, the aligners 504a, 504b can analyze the visual frames to determine that the recording device experienced a left-pan based on an object moving right across sequential visual frames in the digital video.

The aligners 504a, 504b utilize the positional vectors 514a-514c translate and rotate each of the visual features 510a-510c and audio features 512a, 512c, respectively. For example, the aligners 504a, 504b utilize the positional vectors 514a-514c to generate an aligned visual feature 516a (f'$_1$), an aligned visual feature 516b (f'$_2$), an aligned visual feature 516c (f'$_3$), an aligned audio feature 518a (g'$_1$), an aligned audio feature 518b (g'$_2$), and an aligned audio feature 518c (g'$_3$), respectively. In one or more embodiments, the aligned visual features 516a-516c and aligned audio features 518a-518c are elements of $$\mathbb{R}^{(128+64) \times \frac{H'}{2} \times \frac{W'}{2}},$$

where H'<H and W'<W due to padding.

While FIG. 5 illustrates the digital floorplan system 110 generating aligned features in connection with a digital video utilizing the extractors 502a, 502b and the aligners 504a, 504b, other embodiments are possible. For example, in an alternative embodiment, the digital floorplan system 102 can generate aligned features utilizing other computer vision and digital audio techniques. To illustrate, the digital floorplan system 102 can generate aligned features utilizing additional or different machine learning model architectures. Moreover, the digital floorplan system 102 can generate aligned features utilizing additional or alternative heuristics, algorithms, and processes. In one or more embodiments, the digital floorplan system 102 can generate aligned features utilizing a different combination of machine learning and other techniques.

FIG. 6 illustrates the visual feature encoder 602a and the audio feature encoder 602b of the audio-visual floorplan reconstruction machine learning model 400. For example, in response to the visual feature aligner 504a and the audio feature aligner 504b generating the aligned visual features 516a-516c and aligned audio features 518a-518c, as discussed above with reference to FIG. 5, the digital floorplan system 110 further generates visual and audio encodings of the aligned visual and audio features utilizing the visual feature encoder 602a and audio feature encoder 602b. As mentioned above, the encoders 602a, 602b include processing layers that encode bi-directional relationships between the visual features and audio features, respectively.

In more detail, the visual feature encoder 602a receives the aligned visual features 516a-516c and utilizes a convolutional self-attention layer 604a to generate a visual encoding 606a ($\phi_{11}$), a visual encoding 606b ($\phi_{21}$), and a visual encoding 606c ($\phi_{31}$). Similarly, the audio feature encoder 602b receives the aligned audio features 518a-518c and utilizes a convolutional self-attention layer 604c to generate an audio encoding 608a ($\gamma_{11}$), an audio encoding 608b ($\gamma_{21}$), and an audio encoding 608c ($\gamma_{31}$). In one or more embodiments, each of the convolutional self-attention layers 604a, 604c are pixelwise self-attention operations and convolution layers. For example, the convolutional self-attention layers 604a, 604c communicate information across timesteps at each pixel location represented in the aligned visual features 516a-516c and aligned audio features 518a-518c, respectively. To illustrate, the self-attention operation in the convolutional self-attention layer 604a determines correspondences between every pixel represented in each aligned visual feature 516a-516c and every other pixel. Thus, information from a first feature is propagated and aggregated across a second feature and a third feature, and vice versa, in order to account for information present across the entire sequence of features.

The convolutional self-attention layers 604a, 604c further include convolution operations. For example, in one or more embodiments, the convolution operations of the convolutional self-attention layers 604a, 604c include stride=2. By including a stride of this length, the convolution operations simultaneously downsample the aligned features. Accordingly, as shown in FIG. 6, the convolutional self-attention layers 604a, 604c generate visual encodings 606a-606c and audio encodings 608a-608c, respectively, with smaller dimensions than the aligned visual features 516a-516c and the aligned audio features 518a-518c, respectively. Specifically, as discussed above, the aligned visual features 516a-516c and aligned audio features 518a-518c are elements of $$\mathbb{R}^{(128+64) \times \frac{H'}{2} \times \frac{W'}{2}},$$

while the visual encodings 606a-606c and audio encodings 608a-608c are elements of $$\mathbb{R}^{C_1 \times \frac{H'}{4} \times \frac{W'}{4}}$$

As further shown in FIG. 6, the visual feature encoder 602a and the audio feature encoder 602b further include convolutional self-attention layers 604b, 604d, respectively. As with the convolutional self-attention layers 604a, 604c discussed above, the convolutional self-attention layers 604b, 604d include a self-attention operation and a convolution operation. In one or more embodiments, the self-attention operations of the convolutional self-attention layers 604b, 604d further encode the bi-directional relationships among the features represented in the visual encodings 606a-606c and audio encodings 608a-608c, respectively. Additionally, the convolution operations of the convolutional self-attention layers 604b, 604d further downsample the visual encodings 606a-606c and audio encodings 608a-608c, respectively. Accordingly, the resulting the visual encoding 606d ($\phi_{12}$), visual encoding 606e ($\phi_{22}$), visual encoding 606f ($\phi_{32}$), audio encoding 608d ($\gamma_{12}$), audio encoding 608e ($\gamma_{22}$), and audio encoding 608f ($\gamma_{32}$) are elements of $$\mathbb{R}^{C_2 \times \frac{H'}{8} \times \frac{W'}{8}}.$$

Although FIG. 6 illustrates the digital floorplan system 110 encoding aligned features from a digital video utilizing the encoders 602a, 602b, the digital floorplan system 110 can encode aligned features in other ways. For example, in an alternative embodiment, the digital floorplan system 102 can encode aligned features utilizing additional or different machine learning model architectures. Moreover, the digital floorplan system 102 can encode aligned features utilizing additional or alternative heuristics, algorithms, and processes.

As mentioned above, the audio-visual floorplan reconstruction machine learning model can also include an audio-visual decoder. FIG. 7 illustrates the audio-visual decoder 702 of the audio-visual floorplan reconstruction machine learning model 400 in accordance with one or more embodiments. For example, the audio-visual decoder 702 decodes combinations of the encodings generated by the visual feature encoder 602a and the audio feature encoder 602b discussed above. In one or more embodiments, the audio-visual decoder 702 leverages cross-modal information (e.g., across the visual features and the audio features) to simultaneously combine and upsample the features into floorplan predictions. The audio-visual decoder 702 further combines or aggregates the floorplan predictions to generate a two-dimensional floorplan of the three-dimensional space depicted in the digital video.

In more detail, the audio-visual decoder 702 leverages cross-modal information by generating audio-visual encodings 704a, 704b, and 704c. In one or more embodiments, the audio-visual decoder 702 generates the audio-visual encodings 704a-704c by combining intermediate encodings generated by the visual feature encoder 602a and the audio feature encoder 602b discussed above. For example, the audio-visual decoder 702 generates the audio-visual encoding 704a by concatenating the visual encoding 606d ($\phi_{12}$) with the audio encoding 608d ($\gamma_{12}$). Similarly the audio-visual decoder 702 generates the audio-visual encoding 704b by concatenating the visual encoding 606e ($\phi_{22}$) with the audio encoding 608e ($\gamma_{22}$), and the audio-visual encoding 704c by concatenating the visual encoding 606f ($\phi_{32}$) with the audio encoding 608f ($\gamma_{32}$). In additional or alternative embodiments, the audio-visual decoder 702 can combine the visual and audio encodings in other ways besides concatenation.

In one or more embodiments, the audio-visual decoder 702 further includes processing layers that incrementally decode and upsample the audio-visual encodings 704a-704c. For example, as shown in FIG. 7, the audio-visual decoder 702 includes three upsampling self-attention layers 706a, 706b, and 706c that incrementally upsample the audio-visual encodings 704a-704c while simultaneously communicating information across timesteps at each pixel location represented in the audio-visual encodings 704a-704c. In one or more embodiments, the upsampling self-attention layers 706a-706c are similar to the convolutional self-attention layers 604a-604d, but the audio-visual decoder 702 replaces the convolutions of the convolutional self-attention layers 604a-604d with transposed convolutions that upsample features rather than downsampling features. For example, the upsampling self-attention layers 706a-706c compute outputs as:

$$o_{t2} = \text{UpConvSelfAttention}_2([\phi_{t2}, \gamma_{t2}])$$

$$o_{t1} = \text{UpConvSelfAttention}_1([o_{t2}, \phi_{t2}, \gamma_{t2}])$$

$$o_{t0} = \text{UpConvSelfAttention}_0([o_{t1}, f'_t, g'_t])$$

To illustrate, in response to receiving the audio-visual encodings 704a-704c, the upsampling self-attention layer 706a upsamples the intermediate encodings (e.g., the visual encodings 606d-606f and the audio encodings 608d-608f) while simultaneously utilizing information from among the intermediate encodings to fill-in missing information in individual encodings. The upsampling self-attention layer 706a generates intermediate decoded outputs 708a, 708b, and 708c (e.g., $o_{12}$, $o_{22}$, and $o_{32}$) based on the audio-visual encoding 704a-704c in connection with the intermediate encodings (e.g., the visual encoding 606a ($\phi_{11}$), the visual encoding 606b ($\phi_{21}$), the visual encoding 606c ($\phi_{31}$), the audio encoding 608a ($\gamma_{11}$), the audio encoding 608b ($\gamma_{21}$), and the audio encoding 608c ($\gamma_{31}$)) including additional decoded information. For example, the upsampling self-attention layer 706a generates the intermediate decoded output 708a based, at least in part, on the audio-visual encoding 704a, the visual encoding 606a ($\phi_{11}$), and the audio encoding 608a ($\gamma_{11}$).

The audio-visual decoder 702 further upsamples and decodes the intermediate decoded outputs 708a-708c utilizing a second upsampling self-attention layer 706b. As with the upsampling self-attention layer 706a, the upsampling self-attention layer 706b utilizes the intermediate decoded outputs 708a, 708b, and 708c, to generate additional intermediate decoded outputs 708d, 708e, and 708f in connection with additional previously generated aligned features. For example, the upsampling self-attention layer 706b generates the intermediate decoded outputs 708d, 708e, and 708f (e.g., $o_{11}$, $o_{21}$, and $o_{31}$) based on the intermediate decoded outputs 708a, 708b, and 708c (e.g., $o_{12}$, $o_{22}$, and $o_{32}$) and the aligned audio and visual features (e.g., the aligned visual feature 516a ($f'_1$), the aligned visual feature 516b ($f'_2$), the aligned visual feature 516c ($f'_3$), the aligned audio feature 518a ($g'_1$), the aligned audio feature 518b ($g'_2$), and the aligned audio feature 518c ($g'_3$)) including additional decoded information. To illustrate, the upsampling self-attention layer 706b generates the intermediate decoded output 708d based, at least in part, on the intermediate decoded output 708a (e.g., $o_{12}$), the aligned visual feature 516a ($f'_1$), and the aligned audio feature 518a ($g'_1$).

The audio-visual decoder 702 includes an additional third upsampling self-attention layer 706c. In one or more embodiments, the upsampling self-attention layer 706c further upsamples and decodes the intermediate decoded outputs 708d, 708e, and 708f to generate the decoded outputs 708g, 708h, and 708i (e.g., $o_{10}$, $o_{20}$, and $o_{30}$). In one or more embodiments, the upsampling self-attention layer 706c generates the decoded outputs 708g, 708h, and 708i such that $0_{t0} \in \mathbb{R}^{C \times H' \times W'}$.

The audio-visual decoder 702 further includes a convolution layer 710. In one or more embodiments, the convolution layer 710 classifies the decoded outputs 708g, 708h, and 708i with a 1×1 convolution. In at least one embodiment, the 1×1 convolution of the convolution layer 710 generates floorplan predictions 712a, 712b, and 712c for each timestep represented in the digital video. As shown in FIG. 7, the audio-visual decoder 702 generates each floorplan prediction 712a-712c including multiple channels. For example, the floorplan predictions 712a-712c includes layout predictions 713a, 713b, and 713c in a first channel, and one or more semantic room label predictions 715a, 715b, and 715c in additional channels.

In further detail, the layout predictions 713a-713c (notated as $s_t[0, :, :]$) in the zero channels of the floorplan predictions 712a-712c represent binary score maps for the existence of interior space. Additionally, the one or more semantic room label predictions 715a-715c in remaining channels 1, 2, ... $N_r$ (notated as $s_t[i, :, :]$) represent score maps for the existence of specific room types. For example, the audio-visual decoder 702 can determine the existence of room types including, but not limited to: bathrooms, hallways, bedrooms, stairs, kitchens, living rooms, entryways (e.g., foyers, lobbies), dining rooms, closets, offices, lounges, laundry rooms/mudrooms, workout rooms (e.g., gyms, exercise rooms). Thus, each entry within the score maps represents a prediction (e.g., interior/exterior or semantic label predictions) corresponding to an area of the three-dimensional space. In one or more embodiments, the digital floorplan system 110 generates a binary layout map and a separate binary map for each possible room classification (where each binary map reflects the probability that a particular area corresponds to a specific semantic label).

Next, the audio-visual decoder 702 combines the floorplan predictions 712a-712c to generate a two-dimensional floorplan 720. For example, as shown in FIG. 7, the audio-visual decoder 702 includes a max pool layer 714 that produces a final layout prediction 716 and semantic room label predictions 718 based on the sequence of floorplan predictions 712a-712c. In one or more embodiments, the max pool layer 714 combines the channels of the floorplan predictions 712a-712c. For instance, the max pool layer 714 combines the layout predictions 713a-713c to generate the final layout prediction 716. To illustrate, where each of the layout predictions 713a-713c include partial layouts, the max pool layer 714 summarizes and combines the partial layouts to generate the final layout prediction 716 that includes portions of the partial layouts assembled into a full layout in the final layout prediction 716. Similarly, the max pool layer 714 produces the semantic room label predictions 718 by aggregating the semantic room label predictions 715a-715c to determine most likely room labels.

Note that due to the alignment step presented above, the output layout predictions are aligned in the common coordinate frame of the first time step. Therefore, to produce a prediction S for the whole sequence, the digital floorplan system maxpools the predictions $s_t$. The self-attention in the earlier encoder-decoder already accounts for communication across time steps for these per-step estimates. Accordingly, the digital floorplan system outputs the aggregated interior and room classification scores for a video sequence: $S = \mathcal{F}(v_1, a_1, v_2, a_2 \ldots u_{t_r}, a_{t_r})$.

Finally, the audio-visual decoder 702 combines or otherwise aggregates the resulting final layout prediction 716 and semantic room label predictions 718. For example, the audio-visual decoder 702 can overlay the semantic room label predictions 718 on the final layout prediction 716 to generate the two-dimensional floorplan 720. Additionally or alternatively, the audio-visual decoder 702 can provide the final layout prediction 716 as the two-dimensional floorplan 720 (e.g., with no semantic room labels). Thus, the layers of the audio-visual floorplan reconstruction machine learning model 400 generate the two-dimensional floorplan 720 of the three-dimensional space depicted in a sparse digital video that includes frame-audio sample pairs across a small number of timesteps (e.g., three timesteps).

Although FIG. 7 illustrates the digital floorplan system 110 decoding encoded features into a two-dimensional floorplan utilizing the audio-visual decoder 702, the digital floorplan system 110 can generate the two-dimensional floorplan in other ways. For example, in an alternative embodiment, the digital floorplan system 102 can generate the two-dimensional floorplan by decoding encoding features utilizing additional or different machine learning model architectures.

In summary, the digital floorplan system 110 processes audio-visual sequences at various levels. The feature extraction independently processes each time step. The top-down alignment brings the features to a common coordinate frame. The encoders process sequences of each modality independently while integrating information across time, and finally the decoder fuses information from both visual and audio modalities.

Figure 8B:
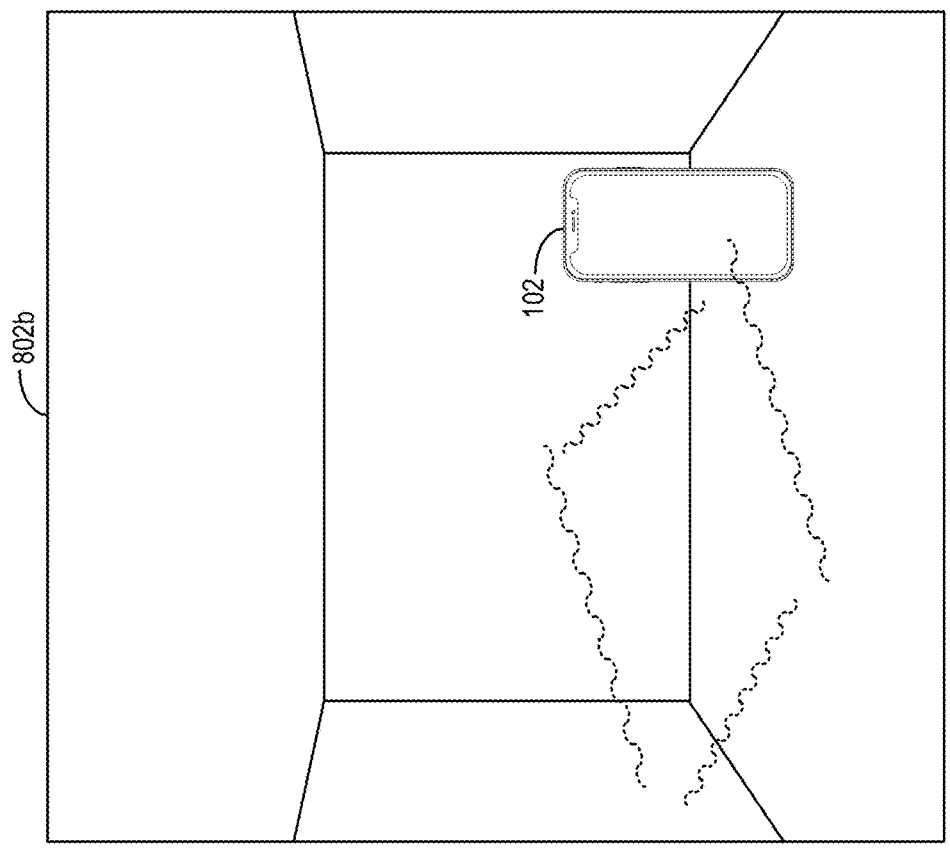
FIGS. 8A and 8B illustrate the digital floorplan system utilizing passive and active audio in accordance with one or more embodiments.
Figure 8A:
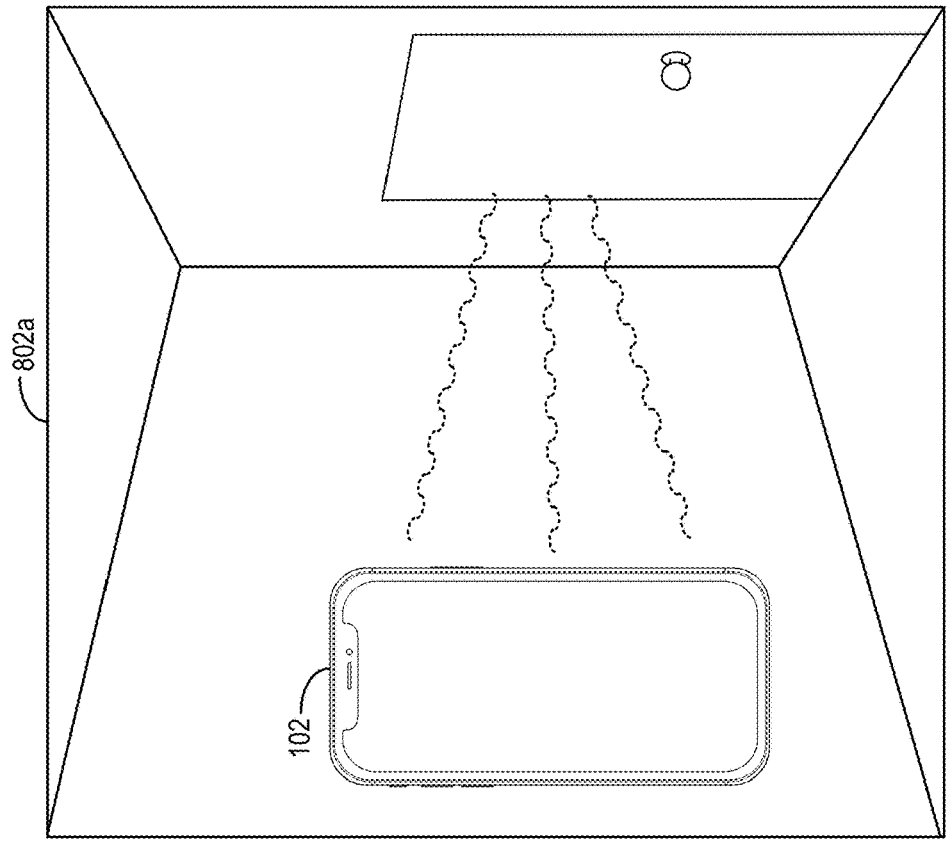

As mentioned above, the digital floorplan system 110 can utilize different types of sound to determine geometry and semantic labels for a three-dimensional space. For example, FIGS. 8A and 8B illustrate the digital floorplan system 110 utilizing different types of sound to infer dimensions and purposes of rooms within a three-dimensional space in accordance with one or more embodiments. In particular, the digital floorplan system 110 utilizes sound propagations to infer beyond the visual regions shown in a digital video as sound can provide strong spatial and semantic signals that complement the mapping capabilities of the digital floorplan system 110. In one or more embodiments, the digital floorplan system 110 utilizes both passive and active types of audio clips. For example, FIG. 8A illustrates the digital floorplan system 110 utilizing passive audio and FIG. 8B illustrates the digital floorplan system 110 utilizing active audio. As will be described in greater detail, the digital floorplan system 110 utilizes passive audio by observing environment-generated sounds occurring within the surrounding three-dimensional space. The digital floorplan system 110 utilizes active audio by emitting sounds from the recording device (e.g., the client computing device 102) and then observing how the emitted sounds reverberate around the three-dimensional space.

In more detail, FIG. 8A illustrates the digital floorplan system 110 observing passive audio within a three-dimensional space 802a. For example, the client computing device 102 can record a digital video within the three-dimensional space 802a that includes audio clips and visual frames across multiple timesteps. In one or more embodiments, the audio clips include passive audio. By analyzing the passive audio within the audio clips captured by a microphone 106 of the client computing device 102, the digital floorplan system 110 can infer the existence, shape, and purpose of an unviewed portion of the three-dimensional space 802a.

To illustrate, the digital floorplan system 110 analyzes passive audio to infer the existence and shape of an unviewed portion of the three-dimensional space 802a. For example, the digital floorplan system 110 can determine that the three-dimensional space 802a includes freespace in an unviewed portion in response to determining that a sound within passive audio is not nearby, and/or being produced by an object (e.g., a person, animal, or other object) that is not currently viewed. For instance, in connection with visual frames of a room with no dog, the digital floorplan system 110 can determine the existence of an unviewed room that includes a dog in response to analyzing passive sounds including a barking dog that is not nearby.

The digital floorplan system 110 further utilizes passive audio to infer purposes of viewed and unviewed portions of the three-dimensional space 802a. For example, in one embodiment, the digital floorplan system 110 analyzes passive audio to identify thirteen types of rooms. In more detail, the digital floorplan system 110 identifies: a bathroom based on sounds including teeth brushing and toilet flushing; a hallway based on silence; a bedroom based on sounds including an alarm clock going off; stairs based on sounds including heavy footsteps; a kitchen based on sounds including a blender, a cabinet door closing, and a dishwasher running; a living room based on sounds including a telephone ringing; an entryway based on sounds including a person knocking on a door; a dining room based on sounds including silverware on plates; a closet based on sounds including a closet door opening and closing; an office based on sounds including typing on a keyboard; a lounge based on silence; a laundry room based on sounds including a washing machine and/or dryer running; and a workout room based on sounds including a person breathing hard. The foregoing provides examples of potential learned sounds correlating to particular room classifications. As described above, the digital floorplan system 110 can utilize machine learning models to intelligently learn what audio features signal a corresponding label to a particular area of a three-dimensional space. Additional detail regarding training an audio-visual floorplan reconstruction machine learning model is provided below (e.g., in relation to FIG. 10).

As shown in FIG. 8B, the digital floorplan system 110 further analyzes active audio to infer the existence and shape of both viewed and unviewed portions of a three-dimensional space 802b. For example, the digital floorplan system 110 can cause the client computing device 102 to emit sounds (e.g., sounds undulating between tones, beeps, alarm sounds) via a speaker 105 while the camera 104 of the client computing device 102 records a digital video of the three-dimensional space 802b thereby creating active sounds within the timesteps of the digital video. The digital floorplan system 110 can then analyze the active sounds to determine how sounds echo and propagate through the three-dimensional space 802b. The digital floorplan system 110 can determine geometric properties based on this analysis. For example, the digital floorplan system 110 can analyze the active sounds to determine the relative locations of walls, a ceiling, and floor of the three-dimensional space 802b, and distances between the recording device (e.g., the client computing device 102) and the walls, ceiling, and floor. The digital floorplan system 110 can further analyze the active sounds to determine the locations and dimensions of unviewed portions of the three-dimensional space 802b (e.g., areas beyond the view of the camera 104 of the client computing device 102), and other objects within the three-dimensional space 802b (e.g., furniture, cabinets, plants).

Figure 9:
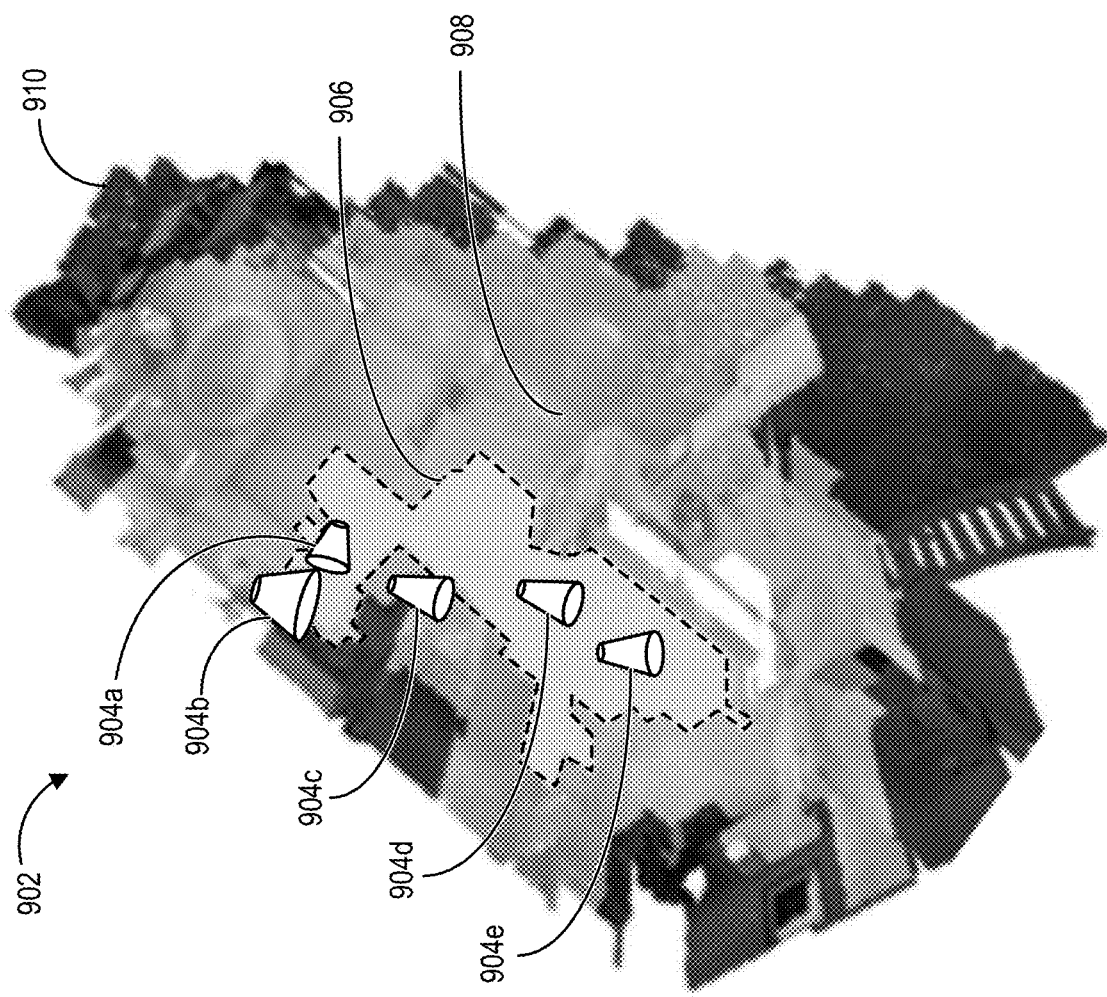
FIG. 9 illustrates a diagram of advantages of the digital floorplan system over conventional systems in accordance with one or more embodiments.
Figure 9:
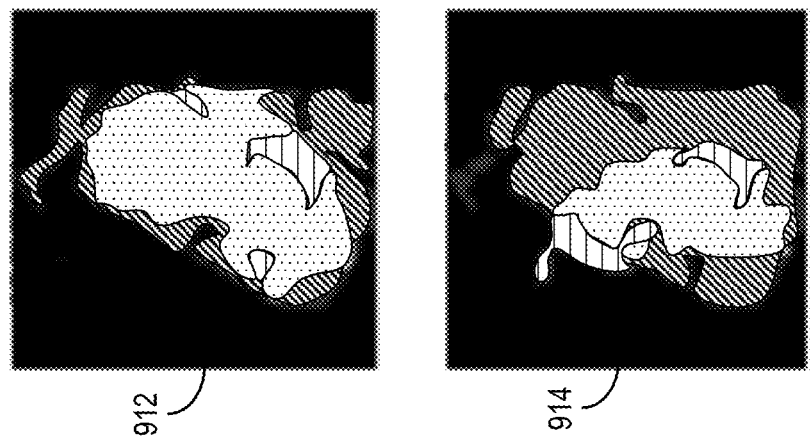

As mentioned above, the digital floorplan system 110 can provide a variety of advantages relative to conventional systems. Researchers have conducted experiments to measure some of these technical improvements. For example, FIG. 9 illustrates the results of some of these experiments. In particular, as shown in FIG. 9, in one or more example experiments a recording device (e.g., the client computing device 102) captures a digital video of the three-dimensional space 902 across five timesteps indicated by the recording device positions 904a, 904b, 904c, 904d, and 904e. The digital video includes visual frames of the viewed portion 906 of the three-dimensional space 902. Thus, the digital video captured by the recording device includes no visual information associated with the unviewed portion(s) 908, 910 of the three-dimensional space 902. In one or more embodiments, the digital floorplan system 110 generates a two-dimensional floorplan of the three-dimensional space 902 that includes the viewed portion 906 and infers at lease the unviewed portion 908.

For example, as shown in FIG. 9, the digital floorplan system 110 generates a two-dimensional floorplan including an indication of the interior of the three-dimensional space 902. As indicated by the two-dimensional floorplan accuracy map 912 for the digital floorplan system 110 and corresponding to the generated two-dimensional floorplan, the digital floorplan system 110 generates the two-dimensional floorplan including true-positive areas indicated by the dotted areas (e.g., correctly identified areas that do exist in the three-dimensional space 902), true-negative areas indicated by the solid black areas (e.g., correctly identified areas that do not exist in the three-dimensional space 902), false positive areas indicated by the diagonally lined areas (e.g., non-existent areas that were incorrectly identified as existing), and false negative areas indicated by the horizontally lined areas (e.g., existent areas that were incorrectly identified as non-existing).

The two-dimensional floorplan accuracy map 912 shows significant improvement in accuracy relative to conventional systems. Indeed, a conventional system generated a two-dimensional floorplan, and, as indicated by the two-dimensional floorplan accuracy map 914, the results were significantly less accurate. For example, as indicated by the two-dimensional floorplan accuracy map 914, the true positive areas (e.g., the dotted areas) identified by the conventional system are much smaller than those identified by the digital floorplan system 110 indicating that the conventional system was limited to the viewed areas within the digital video of the three-dimensional place 902. Similarly, the false-negative areas (e.g., the diagonally lined areas) identified by the conventional system are larger than those identified by the digital floorplan system 110 indicating that the conventional system failed to infer details regarding unviewed areas of the three-dimensional space 902.

Qualitative and quantitative results of experiments indicate that an example embodiment of the digital floorplan system 110 and the audio-visual floorplan reconstruction machine learning model 400 can effectively leverage both audio and visual signals to reason about the extent of the interior of three-dimensional spaces and classify regions of the interior into the associated rooms. For example, researchers considered several baselines for comparison including an interior-only baseline, a projected depth baseline, an OccAnt baseline, an acoustic echoes baselines, and ablations of the audio-visual floorplan reconstruction machine learning model 400 including an audio-only version and an RGB-only version. To illustrate, the interior-only baseline predicts interior pixels everywhere in the considered neighborhood. The projected depth baseline computes a standard occupancy map by projecting depth maps to the ground plane. The OccAnt baseline is the SoTA Occupancy Anticipation model that infers an interior map at each time steps for the 9 m² area in front of the recording device from RGB-D by learning to extrapolate beyond the visible ground-plane projections. And the acoustic echoes baseline assumes that all room shapes are convex polyhedral and estimates room shape by listening to audio echoes. For H×W such that it covers 40 m² at each timestep, the audio-visual floorplan reconstruction machine learning model 400 outperforms all baselines according to at least three separate metrics as indicated by Table 1 below.

TABLE 1

|  | AP | Acc. | Edge AP |
|---|---|---|---|
| Interior-Only | NA | 50.00 | NA |
| Projected Depth | NA | 53.75 | NA |
| OccAnt | 60.27 | 58.45 | 51.52 |
| Acoustic Echoes | NA | 50.37 | NA |
| RGB-Only | 69.05 | 64.20 | 52.93 |
| Audio-Only | 70.44 | 63.06 | 52.85 |
| Audio-Visual Floorplan Reconstructions Machine Learning Model | 73.67 | 66.51 | 55.21 |

Where AP is Average Precision, Acc. is Accuracy, and Edge AP is Edge Average Precision. For example, AP and Acc. compare $S[0, :, :]$ and the binary ground truth map. Edge AP compares the edges of the predicted and ground truth maps in order to emphasize differences in boundary shapes. Pixels are reweighted in all metrics to balance contribution of labels 0 and 1.

Figure 10:
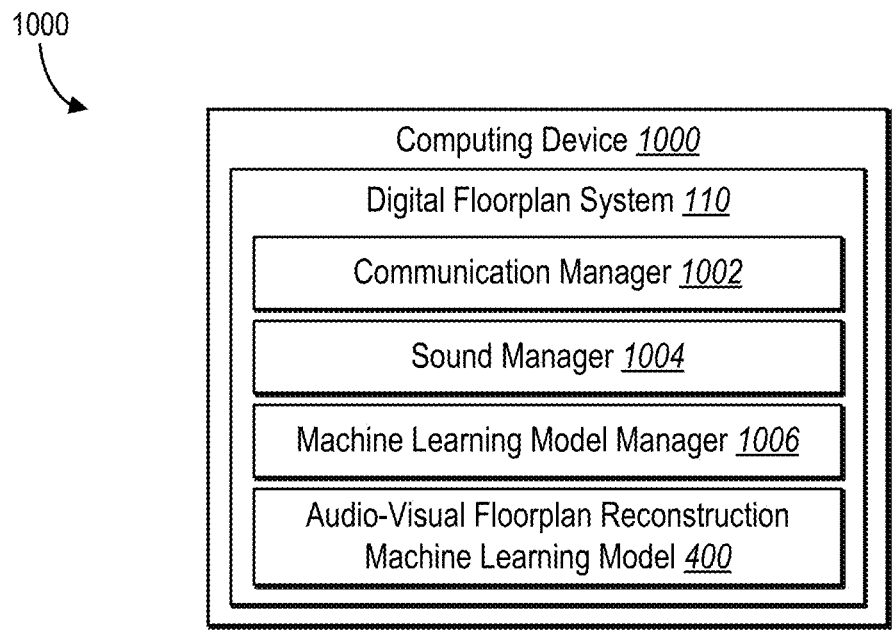
FIG. 10 illustrates a detailed schematic diagram of the digital floorplan system operating on a computing device in accordance with one or more embodiments.

FIG. 10 illustrates a detailed schematic diagram of an embodiment of the digital floorplan system 110 operating on a computing device 1000 in accordance with one or more embodiments. As discussed above, the digital floorplan system 110 is operable on a variety of computing devices. Thus, for example, the computing device 1000 is optionally the server(s) 108 and/or the client computing device 102. In one or more embodiments, the digital floorplan system 110 includes a communication manager 1002, a sound manager 1004, a machine learning model manager 1006, and the audio-visual floorplan reconstruction machine learning model 400.

As mentioned above, and as shown in FIG. 10, the digital floorplan system 110 includes the communication manager 1002. In one or more embodiments, the communication manager 1002 receives and sends electronic communications to and from the digital floorplan system 110. For example, the communication manager 1002 receives digital videos depicting three-dimensional spaces. In at least one embodiment, the communication manager 1002 receives digital videos as submissions via the web browser 106 of the client computing device 102. Additionally or alternatively, the communication manager 1002 receives digital videos as file transfers directly from the client computing device 102 (e.g., via a digital floorplan system application on the client computing device 102). Additionally or alternatively, the communication manager 1002 receives digital videos directly from the camera 104 and microphone 105 of the client computing device 102 (e.g., when the digital floorplan system 110 is installed as a native application on the client computing device 102). Additionally, the communication manager 1002 provides generated two-dimensional floorplans for display on the client computing device 102.

As mentioned above, and as shown in FIG. 10, the digital floorplan system 110 includes the sound manager 1004. In one or more embodiments, the sound manager 1004 causes the client computing device 102 to emit active sounds during recording of a digital video. For example, the sound manager 1004 can cause the speaker 105 of the client computing device 102 to emit one or more active sounds either intermittently or continuously during recording of the digital video. The sound manager 1004 can automatically emit active sounds in response to detecting digital video capture of a three-dimensional space. Additionally or alternatively, the sound manager 1004 can emit active sounds in response to a detected selection of an option associated with capturing digital video of a three-dimensional space.

As mentioned above, and as shown in FIG. 10, the digital floorplan system 110 includes the machine learning model manager 1006. In one or more embodiments, the machine learning model manager 1006 trains and maintains the audio-visual floorplan reconstruction machine learning model 400. For example, the machine learning model manager 1006 trains the audio-visual floorplan reconstruction machine learning model 400 to generate a two-dimensional floorplan with $N_r+1$ channels—with the first channel including an interior map and the remaining channels including semantic pixel-wise room labels.

To illustrate, the machine learning model manager 1006 trains the audio-visual floorplan reconstruction machine learning model 400 by utilizing the audio-visual floorplan reconstruction machine learning model 400 to generate a prediction—such as a layout prediction and/or a semantic room label prediction—based on timesteps of an input digital video. The machine learning model manager 1006 then identifies a ground truth corresponding to the input digital video, and compares the generated prediction to the identified ground truth. For example, in one or more embodiments, the ground truth corresponding to an input digital video includes a verified layout and/or verified semantic room labels corresponding to the three-dimensional space depicted in the input digital video. The input digital video and corresponding ground truth may be part of a training set for training the audio-visual floorplan reconstruction machine learning model 400. In one or more embodiments, the machine learning model manager 1006 compares the generated prediction to the identified ground truth utilizing one or more loss functions, and back propagates the layers of audio-visual floorplan reconstruction machine learning model 400 based on the comparison. In at least one embodiment, the machine learning model manager 1006 repeats this training cycle until the one or more loss functions are minimized (e.g., the audio-visual floorplan reconstruction machine learning model 400 consistently outputs accurate predictions).

In more detail, the machine learning model manager 1006 trains the audio-visual floorplan reconstruction machine learning model 400 to generate layout predictions along the first channel by training the audio-visual floorplan reconstruction machine learning model 400 to perform pixel-wise binary classification where 0s represent the walls or exterior points of the represented space and is represent the points inside the represented space (e.g., floors, furniture, objects). In one or more embodiments, the machine learning model manager 1006 trains the audio-visual floorplan reconstruction machine learning model 400 to compute pixel-wise binary classification probability from the first timestep using the sigmoid function:

$$p_{t_{interior}} = \frac{1}{1 + \exp s_t[0, i, j]}$$

for each pixel location i, j in the two-dimensional coordinate grid.

Additionally, the machine learning model manager 1006 trains the audio-visual floorplan reconstruction machine learning model 400 to generate semantic room labels utilizing multi-class classification of each pixel into one of $N_r$. Thus, the machine learning model manager 1006 trains the audio-visual floorplan reconstruction machine learning model 400 to compute the class-wise probabilities at each pixel using a softmax function. More specifically, the machine learning model manager 1006 trains the audio-visual floorplan reconstruction machine learning model 400 to compute the classification probability for class $n \in \{1, 2, 3, \ldots, N_r\}$ at pixel location (i,j) as:

$$p_{t_{label}}[n-1, i, j] = \frac{\exp s_t[n, i, j]}{\sum_{k=1}^{N_r} \exp s_t[k, i, j]}.$$

In terms of training objects, the machine learning model manager 1006 represents, for each time step t, the ground truth interior and room labels of a H×W area around the recording device by $\gamma_{t_{label}} \in \{0, 1, \ldots N_r\}^{H \times W}$. Because the machine learning model manager 1006 aligns the audio-visual floorplan reconstruction machine learning model 400 with time step t=1, the machine learning model manager 1006 similarly aligns the ground truth interiors and room labels to obtain $\hat{y}_{interior} \in \{0, 1\}^{H' \times W'}$ by padding with zeros, translating and rotating by $r_t$ (where H', W' are the increased dimensions due to padding). Thus, the interior and room map classification objectives for each time step t for pixel location (i,j) are defined as:

$$\mathcal{L}_{interior} = \frac{1}{z}\sum_{t=1}^{t_V}\sum_{i=1}^{H'}\sum_{j=1}^{W'} -\hat{y}_{t_{interior}}[i, j]\log p_{t_{interior}}[i, j]$$

$$\mathcal{L}_{label} = \frac{1}{z}\sum_{t=1}^{t_V}\sum_{i=1}^{H'}\sum_{j=1}^{W'}\sum_{k=1}^{N_r} -\mathbb{1}[\hat{y}_{t_{label}}[i, j] = k]\log p_{t_{interior}}[k, i, j]$$

Where $z=t_V H'W'$,$\mathbb{1}$ is the indicator function, and $t_V$ is the number of timesteps in the video V. In one or more embodiments, the machine learning model manager 1006 ignores the unused pixel locations (i,j) in $\hat{y}_t$ that arise from padding during the alignment step. Thus, the machine learning model manager 1006 trains the audio-visual floorplan reconstruction machine learning model 400 using the sum of both objectives:$\mathcal{L}$ :$\mathcal{L}_{interior}\mathcal{L}_{label}$.

During inference, the machine learning model manager 1006 trains the audio-visual floorplan reconstruction machine learning model 400 to estimate the interior maps (e.g., layout predictions) and room labels for the whole sequence. In one or more embodiments, this is done by max-pooling the predictions $s_t$ to produce a sequence-level prediction S. More specifically, the audio-visual floorplan reconstruction machine learning model 400 includes self-attention layers (e.g., convolutional self-attention layer 604a-604d, and upsampling self-attention layers 706a-706c) to ensure that entire sequences are used to reason about each timestep. Furthermore, because these self-attention layers can process sequences of arbitrary length, the machine learning model manager 1006 can utilize the audio-visual floorplan reconstruction machine learning model 400 in connection with digital videos of varying length.

In one or more embodiments, in order to predict the binary interior map, the machine learning model manager 1006 sets the training threshold p=0.5 the final pixel-wise interior probabilities. To obtain the room label predictions, the machine learning model manager 1006 assigns the most likely room label to each pixel location, and uses the thresholded interior map prediction as a binary mask to get the shape of the predicted room.

In one or more embodiments, the machine learning model manager 1006 generates a training set for generating the audio-visual floorplan reconstruction machine learning model 400. For example, the machine learning model manager 1006 can generate a training set including input digital videos and corresponding ground truth two-dimensional floorplans by leveraging digital images of a three-dimensional space in combination with audio simulations. For example, in one embodiment, the machine learning model manager 1006 utilizes a dataset including large sequences of pixel-dense digital images of three-dimensional spaces and corresponding three-dimensional models of the three-dimensional spaces (e.g., the Matterport3D dataset) in combination with various audio simulations.

For instance, the audio simulations can include realistic digital audio from real environments including large multi-room homes that contain a variety of furnishings. The audio simulations can further include precomputed impulse responses for all source-receiver locations on a dense grid sampled at 1 meter special resolution. For example, the simulations can use multi-band ray tracing to compute the impulse responses from arbitrary geometries and frequency-dependent acoustic material properties, and model both transmission (including through walls) and scattering. In one or more embodiments, the machine learning model manager 1006 can convolve the impulse responses in the audio simulations with any audio clip to generate realistic audio for any source-receiver location, including multiple simultaneous sources.

In more detail, the machine learning model manager 1006 generates a ground truth two-dimensional floorplan of a three-dimensional space utilizing a large and pixel dense digital image sequence and a corresponding three-dimensional model of three-dimensional space. For example, the machine learning model manager 1006 generates the top-down two-dimensional floorplan by projecting a point cloud of data from the digital image sequence to the tow-dimensional ground plane. The machine learning model manager 1006 can further utilize room annotations from the three-dimensional model to assign room labels to each pixel of the two-dimensional floorplan.

Additionally, the machine learning model manager 1006 can generate the input digital video based on the digital image sequence. For example, the machine learning model manager 1006 can assemble an input digital video by identifying digital images from the sequence along short camera trajectories. The machine learning model manager 1006 can further add audio to each camera trajectories in short audio clips (e.g., three seconds). For example, the machine learning model manager 1006 can add device-generated (e.g., active) sounds and/or environment-generated (e.g., passive) sounds in each audio clip.

Each of the components 1002-1006 and 400 of the digital floorplan system 110 includes software, hardware, or both. For example, the components 1002-1006 and 400 include one or more instructions stored on a computer-readable storage medium and executable by processors of one or more computing devices, such as a client computing device or server device. When executed by the one or more processors, the computer-executable instructions of the digital floorplan system 110 can cause the computing device(s) to perform the methods described herein. Alternatively, the components 1002-1006 and 400 includes hardware, such as a special-purpose processing device to perform a certain function or group of functions. Alternatively, the components 1002-1006 and 400 of the digital floorplan system 110 includes a combination of computer-executable instructions and hardware.

Furthermore, the components 1002-1006 and 400 of the digital floorplan system 110 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1006 and 400 may be implemented as a stand-alone application, such as a desktop or mobile application. Furthermore, the components 1002-1006 and 400 may be implemented as one or more web-based applications hosted on a remote server. The components 1002-1006 and 400 may also be implemented in a suite of mobile device applications or "apps."

Figure 11:
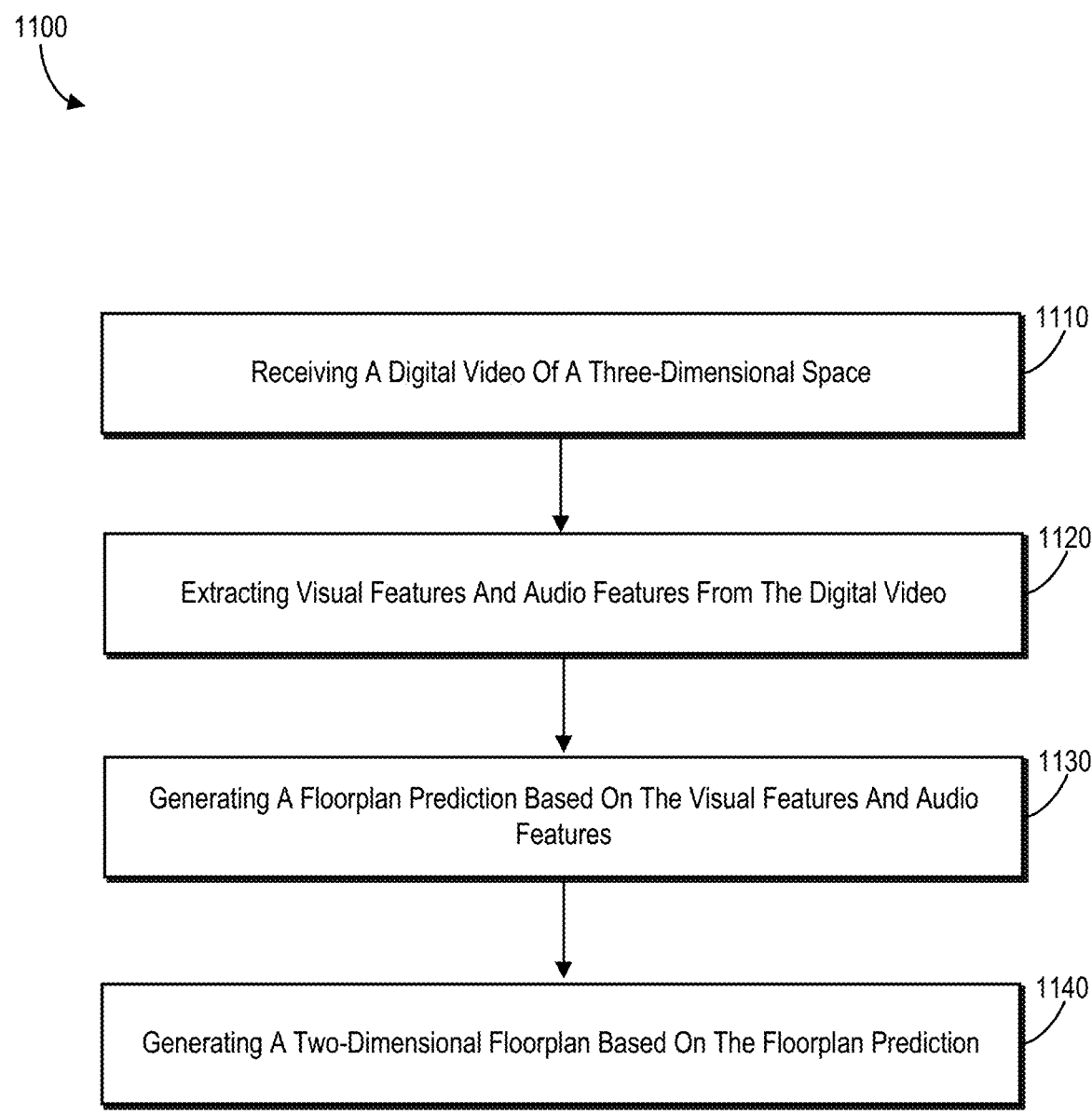
FIG. 11 illustrates a flowchart of a series of acts for generating a two-dimensional floorplan of viewed and unviewed portions of a three-dimensional space depicted in a digital video in accordance with one or more embodiments.

FIGS. 1-10, the corresponding text, and the examples provide a number of different methods, systems, devices, and non-transitory computer-readable media of the digital floorplan system 110. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating a two-dimensional floorplan of viewed and unviewed portions of a three-dimensional space depicted in a digital video in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of receiving a digital video of a three-dimensional space. For example, the act 1110 involves receiving a digital video depicting a viewed portion of a three-dimensional space. Additionally or alternatively, the act 1110 involves receiving a digital video depicting a viewed portion of a three-dimensional space, wherein the three-dimensional space comprises the viewed portion and an unviewed portion.

As shown in FIG. 11, the series of acts 1100 includes an act 1120 of extracting visual features and audio features from the digital video. For example, the act 1120 involves extracting visual features and audio features from a plurality of frame-audio sample pairs of the digital video. In one or more embodiments, extracting the visual features and the audio features from the plurality of frame-audio sample pairs of the digital video includes projecting a digital video frame and an audio clip from each of the plurality of frame-audio sample pairs of the digital videos to a two-dimensional feature grid. For instance, each frame-audio sample pair in the plurality of the frame-audio sample pairs of the digital video can include a digital video frame and an ambisonic audio clip. Additionally, each ambisonic audio clip can include one or more of passive audio reflecting noise from the three-dimensional space captured by a recording device or active audio emitted from a speaker corresponding to the recording device. In at least one embodiment, the series of acts 1100 further includes aligning the extracted visual features and the extracted audio features to a common coordinate system utilizing motion data corresponding to the digital video.

Additionally or alternatively, extracting visual features and audio features from the plurality of frame-audio sample pairs of the digital video includes: generating visual feature vectors for the plurality of frame-audio sample pairs utilizing convolutional layers of a visual feature extractor of the audio-visual floorplan reconstruction machine learning model; and generating audio feature vectors for the plurality of frame-audio sample pairs utilizing convolutional layers of an audio feature extractor of the audio-visual floorplan reconstruction machine learning model. Moreover, aligning the visual feature vectors and audio feature vectors to a common coordinate system can include translating and rotating the position of each of the visual feature vectors and audio feature vectors within the common coordinate system based on incremental positional information corresponding to a recording device that captured the digital video.

As shown in FIG. 11, the series of acts 1100 includes an act 1130 of generating a floorplan prediction based on the visual features and audio features. For example, the act 1130 involves generating a floorplan prediction from the visual features and the audio features utilizing an audio-visual floorplan reconstruction machine learning model. Additionally or alternatively, the act 1130 involves generating one or more floorplan predictions by processing the visual features and the audio features utilizing one or more self-attention layers of an audio-visual floorplan reconstruction machine learning model. Additionally or alternatively, the act 1130 involves generating a plurality of floorplan predictions from the visual features and the audio features utilizing an audio-visual floorplan reconstruction machine learning model, wherein the plurality of floorplan predictions comprises a layout prediction associated with the three-dimensional space and a semantic room label prediction associated with the three-dimensional space.

In one or more embodiments, generating the floorplan prediction includes: generating a layout prediction of one or more rooms of the three-dimensional space from the visual features and the audio features utilizing the audio-visual floorplan reconstruction machine learning model; generating one or more semantic room label predictions for the one or more rooms based on the visual features and the audio features utilizing the audio-visual floorplan reconstruction machine learning model; and combining the one or more semantic room label predictions with the layout prediction to generate the two-dimensional floorplan.

In more detail, generating the floorplan prediction can include: generating visual encodings reflecting bi-directional relationships among the visual features utilizing a visual feature encoder of the audio-visual floorplan reconstruction machine learning model comprising a first self-attention layer; and generating audio encodings reflecting bi-directional relationships among the audio features utilizing an audio encoder of the audio-visual floorplan reconstruction machine learning model comprising a second self-attention layer. For example, generating the floorplan prediction can further include: generating audio-visual encodings by combining the visual encodings and the audio encodings; and generating the floorplan prediction from the audio-visual encodings utilizing an additional self-attention layer of the audio-visual floorplan reconstruction machine learning model.

Additionally or alternatively, generating the one or more floorplan predictions can include: identifying a first visual feature and a second visual feature from the extracted visual features; generating, utilizing the one or more self-attention layers, a first visual encoding and a second visual encoding from the first visual feature and the second visual feature; identifying a first audio feature and a second audio feature of the extracted audio features; and generating, utilizing the one or more self-attention layers, a first audio encoding and a second audio encoding from the first audio feature and the second audio feature. In one or more embodiments, generating the one or more floorplan predictions further includes: generating a first audio-visual encoding by combining the first visual encoding and the first audio encoding; generating a second audio-visual encoding by combining the second visual encoding and the second audio encoding; and generating a first floorplan prediction from the first audio-visual encoding and a second floorplan prediction from the second audio-visual encoding utilizing the one or more self-attention layers of the audio-visual floorplan reconstruction machine learning model.

Additionally or alternatively, generating the one or more floorplan predictions can include: generating a layout prediction of one or more rooms of the three-dimensional space from the visual features and the audio features utilizing the audio-visual floorplan reconstruction machine learning model; and generating one or more semantic room label predictions for the one or more rooms based on the visual features and the audio features utilizing the audio-visual floorplan reconstruction machine learning model As shown in FIG. 11, the series of acts 1100 includes an act 1140 of generating a two-dimensional floorplan based on the floorplan prediction. For example, the act 1140 involves generating a two-dimensional floorplan of the three-dimensional space from the one or more floorplan predictions. Additionally or alternatively, the act 1140 involves generating a two-dimensional floorplan of the viewed portion and the unviewed portion of the three-dimensional space from the floorplan prediction. Additionally or alternatively, the act 1140 involves generating a two-dimensional floorplan of a viewed portion and an unviewed portion of the three-dimensional space from layout predictions and semantic room label predictions of the plurality of floorplan predictions.

Additionally or alternatively, generating the two-dimensional floorplan of the three-dimensional space can include combining the first floorplan prediction and the second floorplan prediction. Additionally or alternatively, generating the two-dimensional floorplan can include combining the one or more semantic room label predictions with the layout prediction to generate the two-dimensional floorplan. For example, combining the one or more semantic room label predictions with the layout prediction can include overlaying the one or more semantic room labels on the layout.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
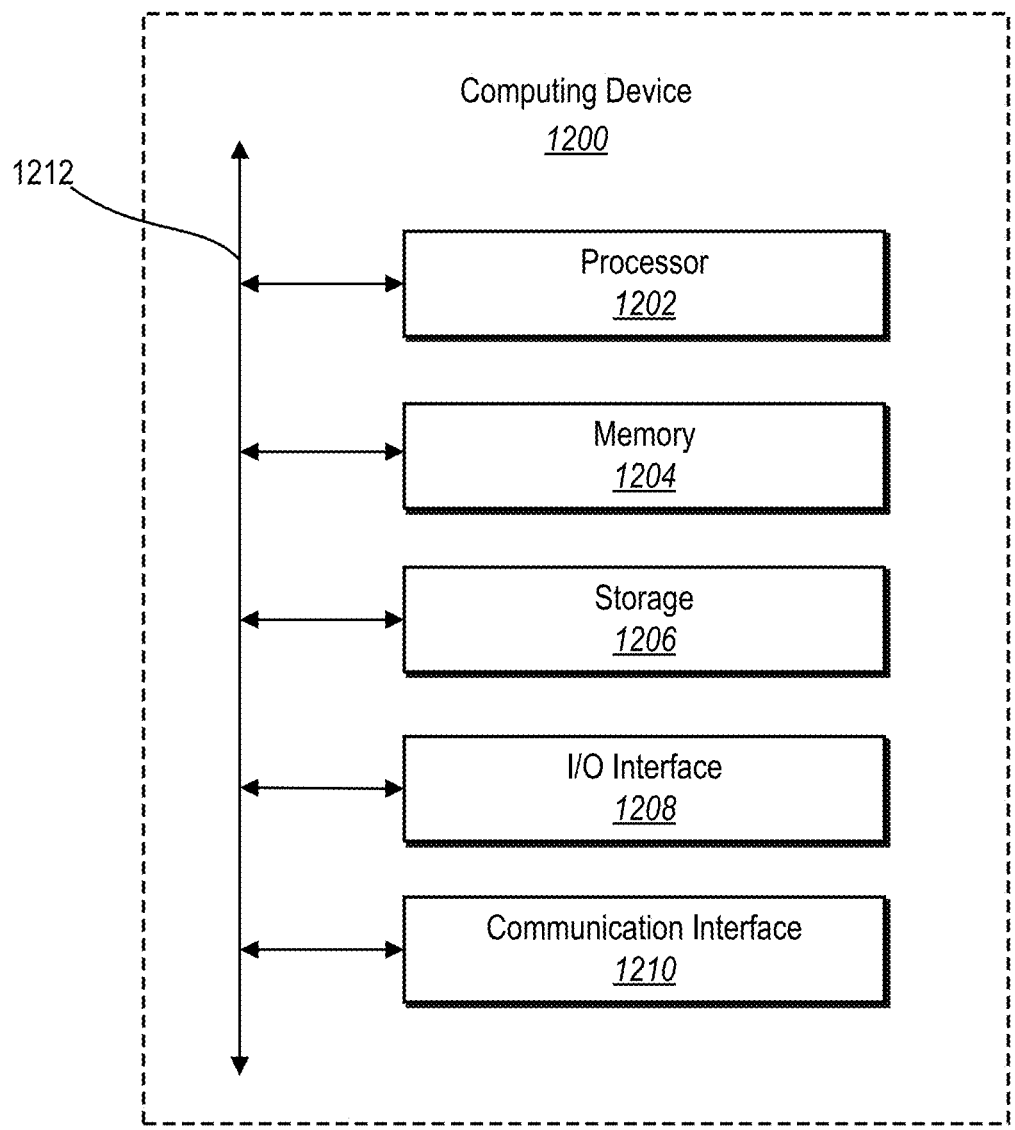
FIG. 12 illustrates a block diagram of an exemplary computing device in accordance with one or more embodiments.

FIG. 12 illustrates a block diagram of exemplary computing device 1200 that may be configured to perform one or more of the processes described above. One will appreciate that one or more computing devices such as the computing device 1200 may implement the digital floorplan system 110. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. While an exemplary computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In one or more embodiments, the processor 1202 includes hardware for executing instructions, such as those making up a computer program. As an example and not by way of limitation, to execute instructions, the processor 1202 may retrieve (or fetch) the instructions from an internal register, an internal cache, the memory 1204, or the storage device 1206 and decode and execute them. In one or more embodiments, the processor 1202 may include one or more internal caches for data, instructions, or addresses. As an example and not by way of limitation, the processor 1202 may include one or more instruction caches, one or more data caches, and one or more translation lookaside buffers (TLBs). Instructions in the instruction caches may be copies of instructions in the memory 1204 or the storage device 1206.

The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1204 may be internal or distributed memory.

The storage device 1206 includes storage for storing data or instructions. As an example and not by way of limitation, storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. The storage device 1206 may include removable or non-removable (or fixed) media, where appropriate. The storage device 1206 may be internal or external to the computing device 1200. In one or more embodiments, the storage device 1206 is non-volatile, solid-state memory. In other embodiments, the storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that couples components of the computing device 1200 to each other. As an example and not by way of limitation, the communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the augmented reality system 102 can be implemented as part of (or including) a networking system. In one or more embodiments, the networking system comprises a social networking system. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a username, the social networking system can access a user node corresponding to the username, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 13:
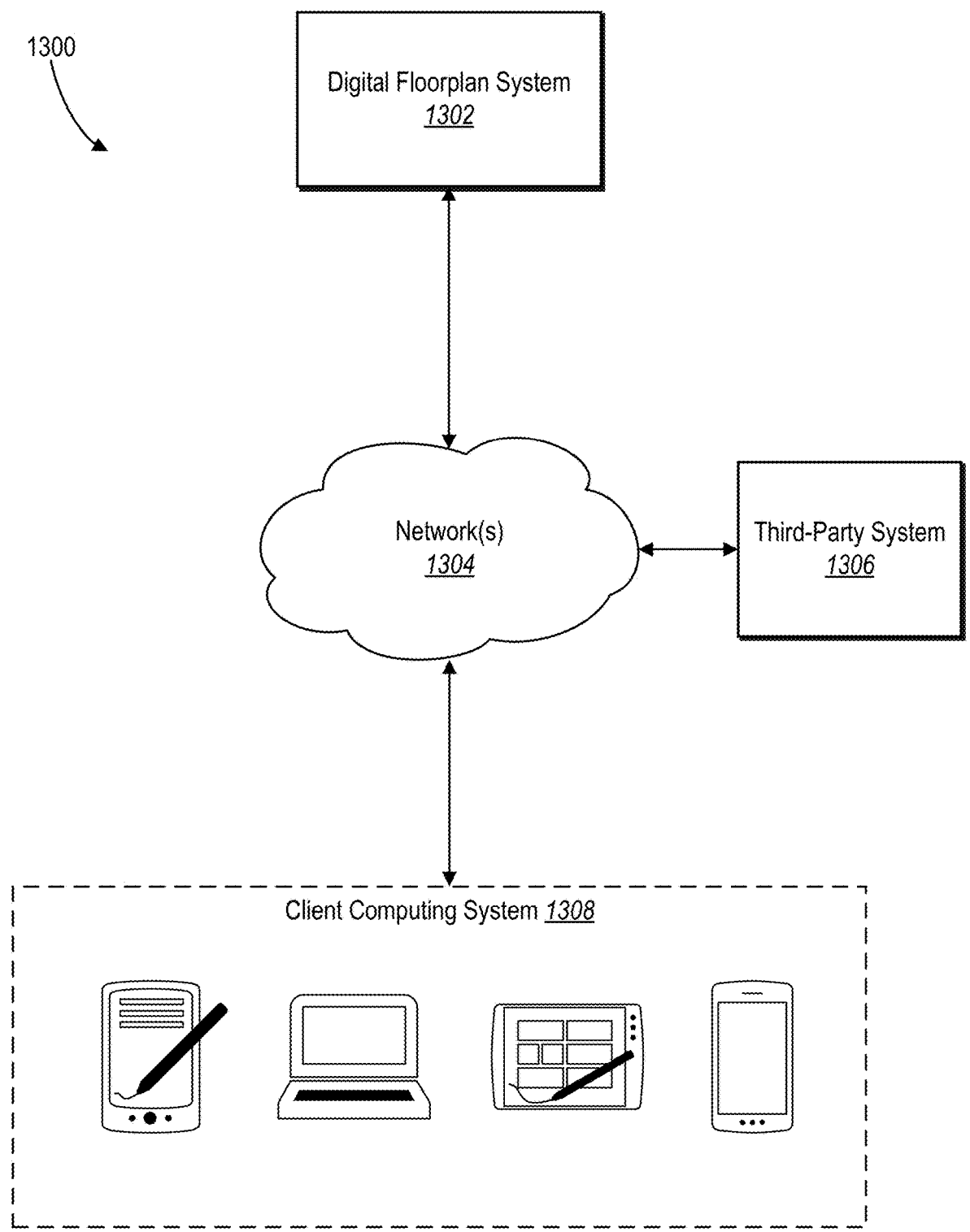
FIG. 13 is an example network environment of an digital floorplan system in accordance with one or more embodiments.

FIG. 13 illustrates an example network environment 1300 of a digital floorplan system 1302. Network environment 1300 includes a client system 1308, an digital floorplan system 1302 (e.g., the digital floorplan system 110), and a third-party system 1306 connected to each other by a network 1304. Although FIG. 13 illustrates a particular arrangement of the client system 1308, digital floorplan system 1302, third-party system 1306, and network 1304, this disclosure contemplates any suitable arrangement of the client system 1308, digital floorplan system 1302, third-party system 1306, and network 1304. As an example and not by way of limitation, two or more of client system 1308, digital floorplan system 1302, and third-party system 1306 may be connected to each other directly, bypassing network 1304. As another example, two or more of the client system 1308, digital floorplan system 1302, and third-party system 1306 may be physically or logically co-located with each other in whole or in part. Moreover, although FIG. 13 illustrates a particular number of client systems 1308, networking systems 1302, third-party systems 1306, and networks 1304, this disclosure contemplates any suitable number of client systems 1308, digital floorplan system 1302, third-party systems 1306, and networks 1304. As an example and not by way of limitation, network environment 1300 may include multiple client systems 1308, digital floorplan systems 1302, third-party systems 1306, and networks 1304.

This disclosure contemplates any suitable network 1304. As an example and not by way of limitation, one or more portions of network 1304 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1304 may include one or more networks 1304.

Links may connect the client system 1308, digital floorplan system 1302, and third-party system 1306 to communication network 1304 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, the client system 1308 may be an electronic device including hardware, software, or embedded logic components or a combination of two or more such components and capable of carrying out the appropriate functionalities implemented or supported by the client system 1308. As an example and not by way of limitation, a client system 1308 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1308. A client system 1308 may enable a network user at the client system 1308 to access network 1304. A client system 1308 may enable its user to communicate with other users at other client devices 1308.

In particular embodiments, the client system 1308 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client system 1308 may enter a Uniform Resource Locator (URL) or other address directing the web browser to a particular server (such as server, or a server associated with a third-party system 1306), and the web browser may generate a Hyper Text Transfer Protocol (HTTP) request and communicate the HTTP request to server. The server may accept the HTTP request and communicate to the client system 1308 one or more Hyper Text Markup Language (HTML) files responsive to the HTTP request. The client system 1308 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, a third-party system 1306 may include one or more types of servers, one or more data stores, one or more interfaces, including but not limited to APIs, one or more web services, one or more content sources, one or more networks, or any other suitable components, e.g., that servers may communicate with. A third-party system 1306 may be operated by a different entity from an entity operating digital floorplan system 1302. In particular embodiments, however, digital floorplan system 1302 and third-party systems 1306 may operate in conjunction with each other to provide social-networking services to users of digital floorplan system 1302 or third-party systems 1306. In this sense, digital floorplan system 1302 may provide a platform, or backbone, which other systems, such as third-party systems 1306, may use to provide social-networking services and functionality to users across the Internet.

In particular embodiments, a third-party system 1306 may include a third-party content object provider. A third-party content object provider may include one or more sources of content objects, which may be communicated to a client system 1308. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, digital floorplan system 1302 may include a variety of servers, sub-systems, programs, modules, logs, and data stores. In particular embodiments, digital floorplan system 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The digital floorplan system 1302 may also include suitable components such as network interfaces, security mechanisms, load balancers, failover servers, management-and-network-operations consoles, other suitable components, or any suitable combination thereof. In particular embodiments, digital floorplan system 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking digital floorplan system 1302 to one or more client system 1308 or one or more third-party system 1306 via network 1304. The web server may include a mail server or other messaging functionality for receiving and routing messages between digital floorplan system 1302 and one or more client systems 1308. An API-request server may allow a third-party system 1306 to access information from the digital floorplan system 1302 by calling one or more APIs. An action logger may be used to receive communications from a web server about a user's actions on or off digital floorplan system 1302. In conjunction with the action log, a third-party-content-object log may be maintained of user exposures to third-party-content objects. A notification controller may provide information regarding content objects to a client system 1308. Information may be pushed to a client system 1308 as notifications, or information may be pulled from client system 1308 responsive to a request received from client system 1308. Authorization servers may be used to enforce one or more privacy settings of the users of digital floorplan system 1302. A privacy setting of a user determines how particular information associated with a user can be shared. The authorization server may allow users to opt in to or opt out of having their actions logged by digital floorplan system 1302 or shared with other systems (e.g., third-party system 1306), such as, for example, by setting appropriate privacy settings. Third-party-content-object stores may be used to store content objects received from third parties, such as a third-party system 1306. Location stores may be used for storing location information received from client system 1308 associated with users. Advertisement-pricing modules may combine social information, the current time, location information, or other suitable information to provide relevant advertisements, in the form of notifications, to a user.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving a digital video depicting a viewed portion of a three-dimensional space, wherein the three-dimensional space comprises the viewed portion and an unviewed portion;
   extracting visual features and audio features from a plurality of frame-audio sample pairs of the digital video by:
      generating a visual feature encoding based on the visual features;
      generating an audio feature encoding based on the audio features; and
      generating an aligned visual feature encoding and an aligned audio feature encoding by projecting the visual feature encoding and the audio feature encoding to a two-dimensional feature grid;
   generating a floorplan prediction utilizing a trained audio-visual floorplan reconstruction machine learning model from the aligned visual feature encoding and the aligned audio feature encoding generated from the plurality of frame-audio sample pairs; and
   generating a two-dimensional floorplan of the viewed portion and the unviewed portion of the three-dimensional space from the floorplan prediction.

2. The computer-implemented method as recited in claim 1, wherein generating the floorplan prediction comprises:
   generating a layout prediction of one or more rooms of the three-dimensional space from the visual features and the audio features extracted from the plurality of frame-audio sample pairs utilizing the trained audio-visual floorplan reconstruction machine learning model;
   generating one or more semantic room label predictions for the one or more rooms based on the visual features and the audio features extracted from the plurality of frame-audio sample pairs utilizing the trained audio-visual floorplan reconstruction machine learning model; and
   combining the one or more semantic room label predictions with the layout prediction to generate the two-dimensional floorplan.

3. The computer-implemented method as recited in claim 1, further comprising extracting the visual features and the audio features from the plurality of frame-audio sample pairs of the digital video by:
   generating visual feature vectors for the plurality of frame-audio sample pairs utilizing convolutional layers of a visual feature extractor of the trained audio-visual floorplan reconstruction machine learning model; and
   generating audio feature vectors for the plurality of frame-audio sample pairs utilizing convolutional layers of an audio feature extractor of the trained audio-visual floorplan reconstruction machine learning model.

4. The computer-implemented method as recited in claim 1, further comprising aligning the visual features and the audio features extracted from the plurality of frame-audio sample pairs to a common coordinate system utilizing motion data corresponding to the digital video.

5. The computer-implemented method as recited in claim 1, wherein generating the floorplan prediction comprises generating at least one of:
   visual encodings reflecting bi-directional relationships among the visual features utilizing a visual feature encoder of the trained audio-visual floorplan reconstruction machine learning model comprising a first self-attention layer; or
   audio encodings reflecting bi-directional relationships among the audio features utilizing an audio feature encoder of the trained audio-visual floorplan reconstruction machine learning model comprising a second self-attention layer.

6. The computer-implemented method as recited in claim 5, wherein generating the floorplan prediction further comprises:
   generating audio-visual encodings by combining the visual encodings and the audio encodings; and
   generating the floorplan prediction from the audio-visual encodings utilizing an additional self-attention layer of the trained audio-visual floorplan reconstruction machine learning model.

7. The computer-implemented method as recited in claim 1, wherein the frame-audio sample pairs in the plurality of the frame-audio sample pairs of the digital video comprise digital video frames and audio clips.

8. The computer-implemented method as recited in claim 7, wherein the audio clips comprise one or more of passive audio reflecting noise from the three-dimensional space captured by a recording device or active audio emitted from a speaker corresponding to the recording device.

9. A system comprising:
at least one processor; and
at least one non-transitory computer readable storage medium storing instructions thereon that, when executed by the at least one processor, cause the system to:
receive a digital video depicting a three-dimensional space;
extract visual features and audio features from a plurality of frame-audio sample pairs of the digital video by:
generating a visual feature encoding based on the visual features;
generating an audio feature encoding based on the audio features; and
generating an aligned visual feature encoding and an aligned audio feature encoding by projecting the visual feature encoding and the audio feature encoding to a two-dimensional feature grid;
generate one or more floorplan predictions by processing the aligned visual feature encoding and the aligned audio feature encoding utilizing one or more self-attention layers of a trained audio-visual floorplan reconstruction machine learning model; and
generate a two-dimensional floorplan of the three-dimensional space from the one or more floorplan predictions.

10. The system as recited in claim 9, further storing instructions thereon that, when executed by the at least one processor, cause the system to extract visual features and audio features from the plurality of frame-audio sample pairs of the digital video by:
generating visual feature vectors for the plurality of frame-audio sample pairs utilizing convolutional layers of a visual feature extractor of the trained audio-visual floorplan reconstruction machine learning model; and
generating audio feature vectors for the plurality of frame-audio sample pairs utilizing convolutional layers of an audio feature extractor of the trained audio-visual floorplan reconstruction machine learning model.

11. The system as recited in claim 10, further storing instruction thereon that, when executed by the at least one processor, cause the system to align the visual feature vectors and audio feature vectors to a common coordinate system by:
translating and rotating positions of the visual feature vectors and audio feature vectors within the common coordinate system based on incremental positional information corresponding to a recording device that captured the digital video.

12. The system as recited in claim 9, further storing instructions thereon that, when executed by the at least one processor, cause the system to generate the one or more floorplan predictions by:
identifying a first visual feature and a second visual feature from the visual features extracted from the plurality of frame-audio sample pairs;
generating, utilizing the one or more self-attention layers, a first visual encoding and a second visual encoding from the first visual feature and the second visual feature;
identifying a first audio feature and a second audio feature of the audio features extracted from the plurality of frame-audio sample pairs; and
generating, utilizing the one or more self-attention layers, a first audio encoding and a second audio encoding from the first audio feature and the second audio feature.

13. The system as recited in claim 12, further storing instructions thereon that, when executed by the at least one processor, cause the system to further generate the one or more floorplan predictions by:
generating a first audio-visual encoding by combining the first visual encoding and the first audio encoding;
generating a second audio-visual encoding by combining the second visual encoding and the second audio encoding; and
generating a first floorplan prediction from the first audio-visual encoding and a second floorplan prediction from the second audio-visual encoding utilizing the one or more self-attention layers of the trained audio-visual floorplan reconstruction machine learning model.

14. The system as recited in claim 13, further storing instructions thereon that, when executed by the at least one processor, cause the system to generate the two-dimensional floorplan of the three-dimensional space by combining the first floorplan prediction and the second floorplan prediction.

15. The system as recited in claim 9, further storing instructions thereon that, when executed by the at least one processor, cause the system to generate the one or more floorplan predictions by:
generating a layout prediction of one or more rooms of the three-dimensional space from the visual features and the audio features extracted from the plurality of frame-audio sample pairs utilizing the trained audio-visual floorplan reconstruction machine learning model; and
generating one or more semantic room label predictions for the one or more rooms based on the visual features and the audio features extracted from the plurality of frame-audio sample pairs utilizing the trained audio-visual floorplan reconstruction machine learning model.

16. The system as recited in claim 15, further storing instructions thereon that, when executed by the at least one processor, cause the system to generate the two-dimensional floorplan by combining the one or more semantic room label predictions with the layout prediction to generate the two-dimensional floorplan.

17. A non-transitory computer-readable medium comprising instructions that, when executed by at least one processor, cause a computing device to:
receive a digital video depicting a three-dimensional space;
extract visual features and audio features from a plurality of frame-audio sample pairs of the digital video by:
generating a visual feature encoding based on the visual features;
generating an audio feature encoding based on the audio features; and
generating an aligned visual feature encoding and an aligned audio feature encoding by projecting the visual feature encoding and the audio feature encoding to a two-dimensional feature grid;

generate a plurality of floorplan predictions utilizing a trained audio-visual floorplan reconstruction machine learning model from the aligned visual feature encoding and the aligned audio feature encoding, wherein the plurality of floorplan predictions comprises a layout prediction associated with the three-dimensional space and a semantic room label prediction associated with the three-dimensional space; and generate a two-dimensional floorplan of a viewed portion and an unviewed portion of the three-dimensional space from layout predictions and semantic room label predictions of the plurality of floorplan predictions.

18. The non-transitory computer-readable medium as recited in claim 17, further comprising instructions that, when executed by the at least one processor, cause the computing device to extract visual features and audio features from the plurality of frame-audio sample pairs of the digital video by:

generating visual feature vectors for the plurality of frame-audio sample pairs utilizing convolutional layers of a visual feature extractor of the trained audio-visual floorplan reconstruction machine learning model; and generating audio feature vectors for the plurality of frame-audio sample pairs utilizing convolutional layers of an audio feature extractor of the trained audio-visual floorplan reconstruction machine learning model.

19. The non-transitory computer-readable medium as recited in claim 18, further comprising instructions that, when executed by the at least one processor, cause the computing device to generate the plurality of floorplan predictions by:

generating, utilizing one or more self-attention layers of the trained audio-visual floorplan reconstruction machine learning model, a first visual encoding from a first visual feature;

generating, utilizing the one or more self-attention layers of the trained audio-visual floorplan reconstruction machine learning model, a first audio encoding from a first audio feature;

generating an audio-visual encoding by combining the first visual encoding and the first audio encoding; and generating the layout prediction and the semantic room label prediction based on the audio-visual encoding.

20. The non-transitory computer-readable medium as recited in claim 19, further comprising instructions that, when executed by the at least one processor, cause the computing device to generate the two-dimensional floorplan by:

generating a layout of the two-dimensional floorplan by combining the layout predictions;

generating one or more semantic room labels by combining the semantic room label predictions; and overlaying the one or more semantic room labels on the layout.

* * * * *